United States Patent
Delio, Jr.

(10) Patent No.: US 9,465,717 B2
(45) Date of Patent: Oct. 11, 2016

(54) NATIVE CODE PROFILER FRAMEWORK

(71) Applicant: Riverbed Technology, Inc., San Francisco, CA (US)

(72) Inventor: John J. Delio, Jr., Manchester, NH (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 0 days.

(21) Appl. No.: 14/211,359

(22) Filed: Mar. 14, 2014

(65) Prior Publication Data

US 2014/0282431 A1    Sep. 18, 2014

Related U.S. Application Data

(60) Provisional application No. 61/781,856, filed on Mar. 14, 2013.

(51) Int. Cl.

| G06F 9/45 | (2006.01) |
|---|---|
| G06Q 30/02 | (2012.01) |
| G06F 11/34 | (2006.01) |
| G06F 11/36 | (2006.01) |
| G06F 11/30 | (2006.01) |

(52) U.S. Cl.
CPC ....... *G06F 11/3466* (2013.01); *G06F 11/3003* (2013.01); *G06F 11/3093* (2013.01); *G06F 11/36* (2013.01); *G06F 2201/865* (2013.01)

(58) Field of Classification Search
None
See application file for complete search history.

(56) References Cited

U.S. PATENT DOCUMENTS

| 5,381,534 | A * | 1/1995 | Shi ............................... 709/203 |
| 7,043,469 | B2 * | 5/2006 | Goralwalla et al. |
| 7,188,122 | B2 * | 3/2007 | Smith et al. |
| 8,250,214 | B2 * | 8/2012 | Susai et al. .................. 709/227 |
| 8,683,193 | B1 * | 3/2014 | Hansen ........................ 713/153 |
| 8,978,053 | B2 * | 3/2015 | Clark ........................... 719/331 |
| 2009/0052440 | A1 * | 2/2009 | Pfeffer et al. ................. 370/352 |
| 2009/0249368 | A1 * | 10/2009 | Needamangala et al. .... 719/328 |
| 2009/0271172 | A1 * | 10/2009 | Mejdrich et al. ............... 703/26 |
| 2009/0282289 | A1 * | 11/2009 | Nori et al. ...................... 714/38 |
| 2010/0088688 | A1 * | 4/2010 | Edwards et al. ............. 717/151 |
| 2011/0271289 | A1 * | 11/2011 | Weiser et al. ................ 719/317 |
| 2012/0304160 | A1 * | 11/2012 | Soeder ......................... 717/148 |
| 2013/0041756 | A1 * | 2/2013 | Carion et al. .............. 705/14.64 |
| 2014/0156716 | A1 * | 6/2014 | Baptist et al. ................ 707/827 |
| 2014/0359582 | A1 * | 12/2014 | Needamangala et al. .... 717/130 |

* cited by examiner

*Primary Examiner* — Li B Zhen
*Assistant Examiner* — Mohammad Kabir
(74) *Attorney, Agent, or Firm* — Park, Vaughan, Fleming & Dowler LLP; Laxman Sahasrabuddhe

(57) ABSTRACT

Embodiments provide systems, methods, and computer program products for dynamically hooking multiple levels of application code. A server receives identifying information that identifies a target function of a target application to hook. The server pauses a target process of the target application. The server locates the target function within the target application code based on the received identifying information. The server then hooks the located function outside of the target application, thereby creating hooked code during application runtime.

19 Claims, 13 Drawing Sheets

NATIVE CODE PROFILER FRAMEWORK

CROSS-REFERENCE TO RELATED APPLICATIONS

The present application claims the benefit of U.S. Provisional Patent Application No. 61/781,856, filed on Mar. 14, 2013, which is incorporated herein by reference in its entirety.

BACKGROUND

1. Technical Field

The present disclosure relates generally to dynamically hooking and de-hooking application code.

2. Background Art

Instrumentation of software application code is a process of inserting additional instructions into the code stream to enable measurement of one or more properties of the code while executing in an environment. This enables visibility into processor and memory usage of applications on a given system. But it is not usually possible to view what code is executing within a running application. A debugger may allow a step-through of code to view code execution, but this requires a debugger to be installed and knowledge of where to place appropriate break points. Debugging also interrupts normal program flow at the break points and only one debugger may be used at a time.

Applications can be written in native code, managed code, or in a mixture of both managed and native code. Current techniques for instrumenting applications do not provide an ability to instrument both of these levels of code, or the ability to remove the instrumentation without stopping the application. Visibility into other levels of instrumentation or calls across boundaries to native code is not currently possible. Further, in managed or Just-In-Time (JIT) compiled code, system calls, library calls, and internal calls are not visible with current instrumentation techniques.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Example Operating Environment

Figure 1:
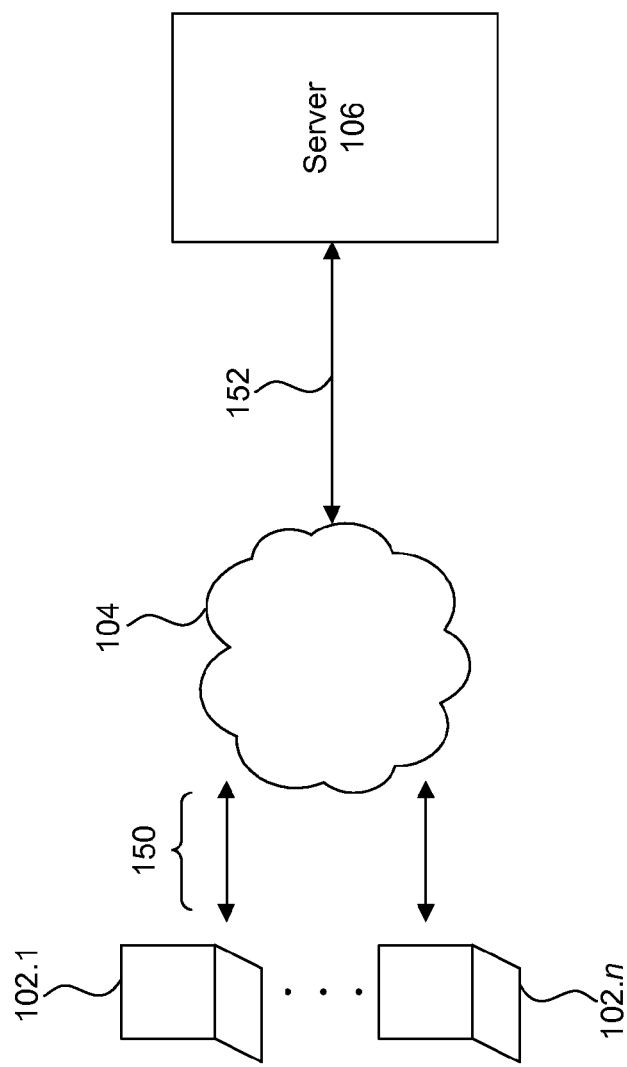
FIG. 1 illustrates an exemplary environment according to an embodiment.

FIG. 1 illustrates an exemplary environment 100 in which software applications may execute and be hooked, according to an embodiment of the present disclosure. Example environment 100 is provided for the purpose of illustration and is not limiting of embodiments of the present disclosure. As will be discussed in more detail with respect to the various embodiments and figures below, embodiments of the present disclosure enable the dynamic hooking of a software application's machine code. In an embodiment, this may include dynamic instrumentation and de-instrumentation of software application code that permits complete visibility into the application regardless of programming language, operating system, and operating device. In another embodiment, this includes dynamic patching and de-patching of software application code to fix or change the software application code. What is done with hooked points depends upon what adapters are specified for use, as will be discussed in more detail below.

In an embodiment, hooking of software application code is performed on machine code, as opposed to native code or managed code. Managed code may refer to code written in Java or C#, to name a few examples. These programming languages make use of a runtime component within an application that performs JIT compilation of byte code or Common Intermediate Language (CIL) into native code. Native code may refer to code written in any programming language used to directly produce binary machine code to be used directly by a processor. For example, C or C++ are examples of programming languages where the associated tool-chain creates binary machine code. Machine code may refer to assembly language code or numerical machine code. Examples in this disclosure will make reference to assembly-level code when discussing machine code.

Hooking machine code allows for all desired hooking points, and works for bound imported libraries, unbound imported libraries, delay loaded libraries, system calls, internal application code, internal imported library code, individual instructions, functions that are hot patchable, and hot patched functions. Embodiments of the present disclosure may also be used for providing hot patches of functions missing hot patch staging. Machine code hooking also allows the hooking to be operating system agnostic; the hooking only needs to be performed differently based on the processor type used. For example, the only difference in processing across the different hook points may be obtaining the addresses.

Although embodiments of the present disclosure may be implemented within various operating systems, the present disclosure will discuss exemplary embodiments with respect to a Windows® environment for sake of simplicity. Other operating environments can also be used as will be recognized by those skilled in the relevant art(s).

As shown in FIG. 1, example network environment 100 includes a plurality of user terminals 102.1 through 102.*n*, a network 104, and a server 106. In an embodiment, the plurality of user terminals 102.1 through 102.*n* may be personal computing devices, such as desktop computers, laptop computers, tablet computers, mobile phones, PDAs, just to name a few examples, or any combination of the above. A user terminal, such as user terminal 102.1, may initiate a transaction request to server 106. The user of user terminal 102.1 may be a human. Alternatively, the user may be any computer or application capable of requesting the use of computing resources on the server 106. For example, the request may be based on the user's browsing of a particular website, use of a cloud computing service, or some other remote application as will be understood by a person skilled in the relevant art(s). In addition or alternatively, transaction requests may be made by an application executing on server 106.

The user terminal 102.1 may transmit the transaction request to the server 106 via a network 104. The user terminal 102.1 may connect to the network 104 via a connection 150, and the server 106 may connect to the network 104 via a connection 152. In one example, the network 104 may be the Internet connecting the server 106, e.g. a web server, to the user terminal 102.1. The network 104 may alternatively be an intranet, such as a local area network (LAN). The user terminal 102.1 may communicate with the server 106 using a variety of different communications protocols as will be recognized by those skilled in the relevant art(s). The server 106, generally, may be any type of computing device configured to perform processing tasks on behalf of a user, whether remote or local to the server 106. In response to the transaction request, the server 106 may start an application in a new process or in an existing process, for example a thread. Alternatively, the server 106 may receive the transaction request as part of an application that is already executing on server 106. For sake of discussion, a "target application" herein is an application subject to instrumentation, and a "target process" herein is a process which is executing a target application. Further, a "hook" may refer herein to software code that is designed to intercept function calls/messages/events that are passed between software components of the target application, and which provide a callback to indicate that the targeted function/method/line of instruction has been called. A hook may be inserted before or during runtime (e.g., instrumenting and/or de-instrumenting a target application while the target application is executing).

In an alternative example, the server 106 may house a database which receives queries from user terminals 102.1 through 102.*n*. In such an example, the user terminals 102.1 through 102.*n* may be located within the same vicinity as the server 106, for example behind a common firewall in an intranet, or may be located remotely from the server 106 and may connect to the server 106 via a virtual private network (VPN) or via an unsecured connection, as will be understood by those skilled in the relevant art(s).

Using embodiments of the present disclosure, a profiling framework may operate on server 106 and enable insight into a complete picture of the application. As will be discussed in more detail below, the profiling framework performs dynamic hooking and de-hooking of an application, without requiring the application to end, outside of the process in which the application is executing. This decreases the number of libraries, such as helper libraries, that have to be loaded into the target process executing the target application. This also reduces memory and thread usage. As a result, the target process is only modified under absolutely necessary conditions, which in turn enables process statistics to more closely reflect operation of the application if the application were not hooked.

Figure 2:
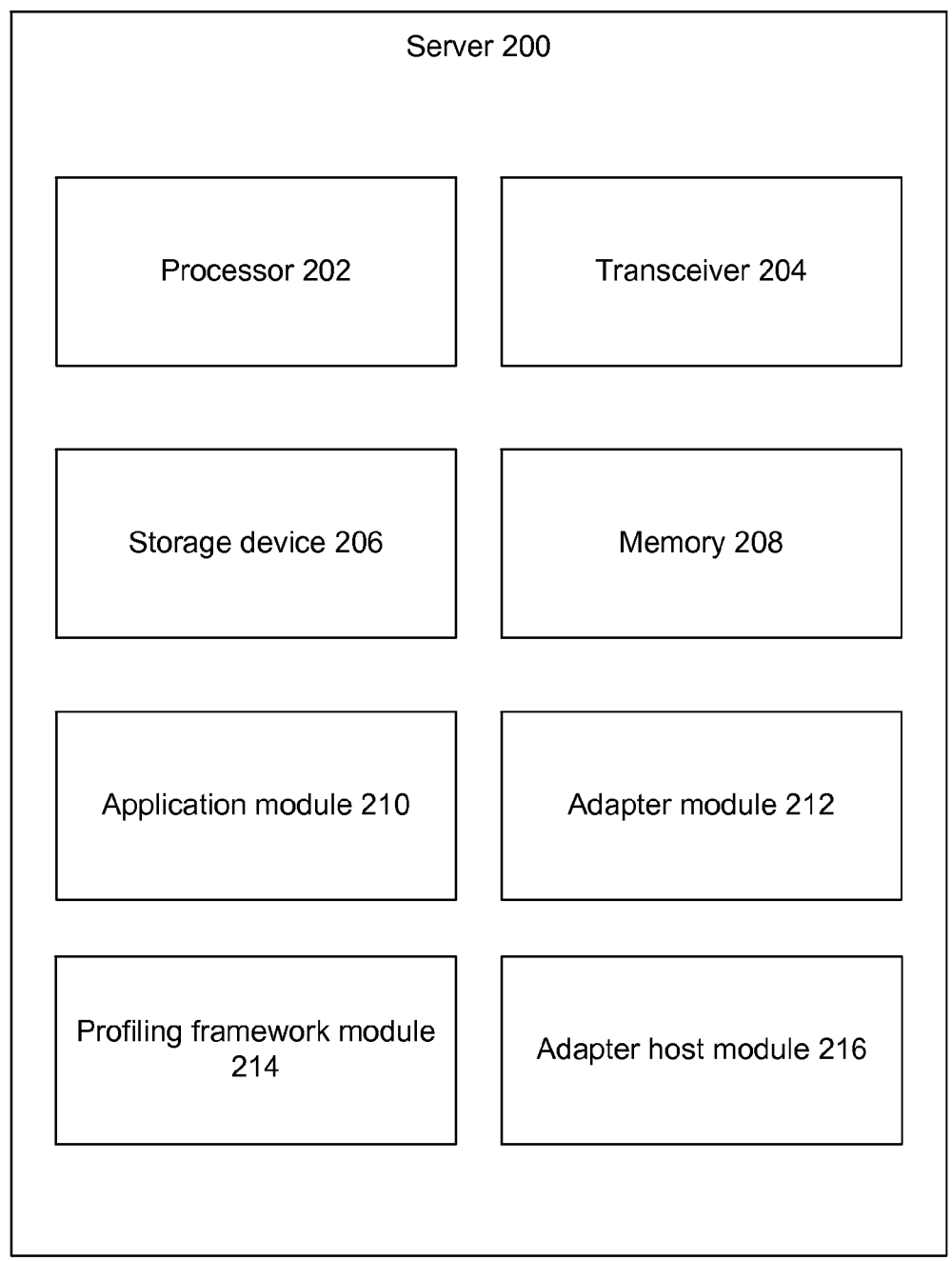
FIG. 2 illustrates an exemplary server apparatus according to an embodiment.

FIG. 2 illustrates an exemplary server 200 according to an embodiment. The server 200 may be an example of server 106 from FIG. 1. The server 200 may be used, for example, to execute a target application and to hook that target application. One or more adapters may use server 200 to provide a complete performance picture of the target application based on the hooked points. Although described as a server, those skilled in the relevant art(s) will recognize that other computing devices may also be used in processing and instrumenting applications.

The server 200 may include one or more processors 202. The one or more processors 202 may each include one or more processing cores, capable of performing parallel or sequential operations, for example by use of threads. Server 200 may also include a transceiver 204, for example an Ethernet connection, WiFi connection, or other connection capable of enabling the server 200 to transmit and receive data to/from external sources. The server 200 may include a storage device 206, for example a hard drive, flash drive, or other types of long-term storage as will be understood by persons skilled in the relevant art(s). The server may also include memory 208, such as random access memory (RAM).

Application module 210 includes the application code subject to hooking by embodiments of the present disclosure. For example, the application module 210 may be, or include, the target application operating within the target process.

Adapter module 212 indicates to the adapter host module 216, which in turn notifies the profiling framework module 214, the functions or code that are desired to be hooked, as well as any specialized processing desired to be performed when the hooks are triggered. The adapter module 212 may specify instrumentation functions to be performed at the hooked points, or that the hooked point be used to call a function that repairs the original function or replaces the original function's functionality, just to name a few examples. The adapter module 212 may be a domain-specific adapter that includes domain-specific knowledge about the application or the library being used by the application and what is sought to be instrumented and captured. Alternatively, the adapter module 212 may be a generalized adapter that does not include any domain-specific knowledge. As just one example, the adapter module 212 may be a Java Native Interface (JNI) profiler adapter library that is aware of the functions it needs to hook in order to provide the most relevant information to users. The adapter module 212 may be expressly associated with the profiling framework module 214, or may be created by any separate party that has an interest in hooking specific applications, libraries, and/or functions for monitoring or changing.

The adapter module 212 may represent a single adapter or multiple adapters specifying different functions, methods, or instructions to hook in any given target application. The adapter module 212 may be a hot patch adapter, an instrumentation adapter, a reverse engineering adapter, or any combination of these, just to name a few examples. The adapter module 212 may be implemented as one or more dynamic libraries, for example dynamic link libraries in a Windows® environment. The libraries may be dynamic so that the libraries are loaded into the target process to enable the profiling framework module 214 to place one or more hooks into the target application. In an embodiment, the profiling module 214 injects an adapter host module 216 into the target process, and the adapter host module 216 then loads the adapter module 212.

Profiling framework module 214 is the out-of-process framework that performs many low-level operations outside of the target process. The profiling framework module 214 and the adapter host module 216 include a disassembler that enables the profiling framework module 214 to look at the machine code of the target application and identify current processor architecture-specific instructions. The profiling framework module 214 performs the work necessary to locate the function specified by the adapter module 212.

The adapter module 212 may use the adapter host library 216 to determine what functions should be targeted, e.g. are most likely interesting, by calculating function complexity. In an embodiment, the disassembler is used to disassemble the functions and inspect the instructions used within the function. Constructs such as loops, branches, and calls to functions can be identified and used to calculate a value to describe the complexity. This value can then be analyzed by adapter module 212 to determine if the function should be hooked.

The profiling framework module 214 performs the actual code modifications necessary in hooking the target application, such as application module 210. The profiling framework module 214 may also maintain a hook table to keep track of hook points within the target process. The adapter host module 216 may also preserve one or more stacks and one or more registers associated with the target application. The profiling framework module 214 also performs the code modifications necessary to de-hook the target application, either off-line or dynamically while the target application is still executing.

The adapter host module 216 may be one or more libraries associated with the profiling framework module 214. The adapter host module 216 communicates with the adapter module 212 to assist with providing discovery information determined by the profiling framework module 214. The adapter host module 216 hosts the adapter module 212 within the target process to provide in-process support. The adapter host module 216 may be used for locating functions, methods, or specific instructions within the target application, loading one or more adapters from the adapter module 212, and providing support for those adapters. The adapter host module 216 also functions as an intermediary between the profiling framework module 214 and the adapter module 212. In an embodiment, the adapter host module 216 may be written in C and assembly code. This minimizes the number of dependencies the library uses, such as not having to rely on standard template library (STL) code.

The adapter host module 216 provides discovery functionality in response to a request from the adapter module 212 for a listing of import and export functions along with other detailed information, such as from static call analysis. The adapter module 212 may then specify location information, such as the library and function name or ordinal for imported/exported functions, or symbol name and address of functions or instructions, in order to locate where to hook. Since the adapter host module 216 provides this functionality, the adapter module 212 does not need to be concerned about the file formats and platform specifics. This makes it easy for the adapter module 212 to hook imported or exported functions and insulates the adapter module 212 from needing to have knowledge of the inner workings of platform-specific file formats. As a result, the adapter module 212 may be written in an operating system agnostic manner.

In embodiments where hooking the target application results in data output (e.g., where the adapter module 212 specifies one or more instrumentation functions to be performed at the hooked points), the data may be compiled in trace files and can be stored, in one example, in the storage device 206. Alternatively or in addition, the trace files may be transmitted and stored in another storage device at another server or mass storage device, as will be recognized by those skilled in the relevant art(s). The data in the trace files may be used to analyze various performance metrics of the target application (e.g., as contained in application module 210) as well as the underlying system on which the target application executes. As another example, the data may be used for reverse engineering, for example to understand call sequences based on user or system events.

Figure 11:
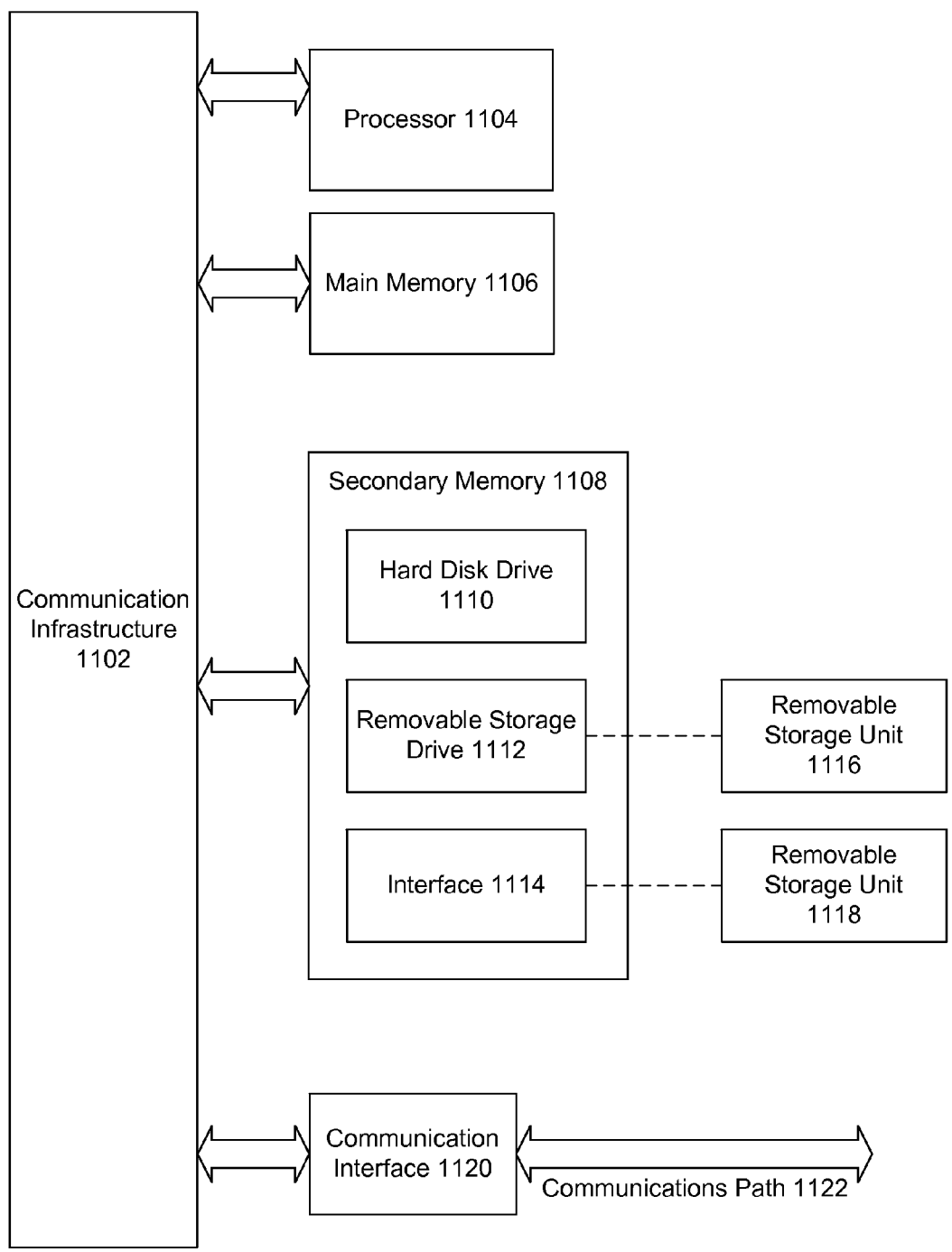
FIG. 11 illustrates an exemplary computer system that can be used to implement aspects of embodiments.

An exemplary embodiment of server 200 will be discussed in further detail below with respect to FIG. 11. As will be recognized by those skilled in the relevant art(s), the different functions of server 200 depicted in FIG. 2 may be performed within the server 200, or alternatively may be performed by a plurality of different servers or other types of computing devices operating in cooperation within a geographic vicinity of each other or at geographically different locations.

Figure 3A:
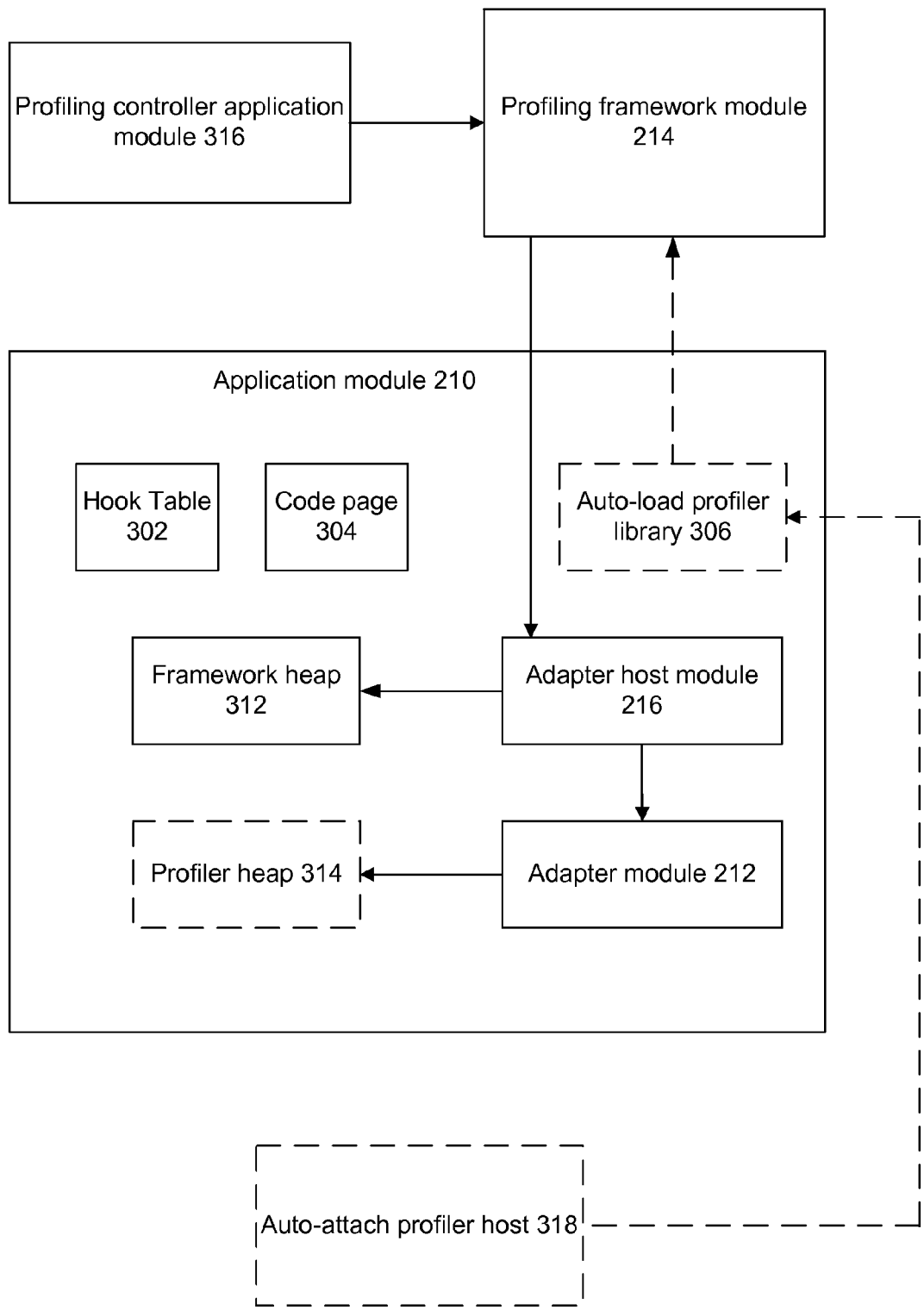
FIG. 3A illustrates an exemplary profiling framework architecture according to an embodiment.

FIG. 3A illustrates an exemplary profiling framework architecture according to an embodiment. The exemplary profiling framework architecture illustrates an operational relationship between the various modules discussed with respect to FIG. 2 above.

There are several different ways in which the hooking process may begin. The hooking process may begin from an external process, from a library within the target process, or from the target process itself. For example, FIG. 3A illustrates a profiling controller application module 316, which may be one way in which hooking via the profiling framework module 214 may begin. The profiling controller application module 316 may be an application outside the scope or domain of the profiling framework module 214. The profiling controller application module 316 indicates to the profiling framework module 214 what target application to hook, and may also identify one or more adapter modules 210 to use for hooking. As an optional alternative, an auto-attach profiler host 318 may automatically inject the optional auto-load profiler library 306 into the target process. The optional auto-load profiler library 306 may act as an in-process controller to call the profiling framework module 214 to begin hooking. These are by way of example only and other ways to initiate embodiments of the present disclosure are possible as will be recognized by those skilled in the relevant art(s). Several exemplary alternatives are discussed in more detail with respect to FIG. 5 below.

In embodiments where initiation begins with an external process, such as profiling controller application module 316, profiling framework module 214 receives the information from the profiling controller application module 316 and injects the adapter host module 216 into the application module 210. After the adapter host module 216 is loaded, the profiling framework module 214 sends information to the adapter host module 216 indicating a set of adapter modules 212 to be used. The adapter modules 212 may be used to specify what actions to take, such as what function(s)/methods/machine instruction/line of code to hook, as well as whether to perform an instrumentation or hot patch function at the hooked points. The adapter libraries of adapter module 212 may include one or more adapters, each identifying one or more actions to take. The adapter host module 216 then dynamically loads the specified adapter modules 212 into the process address space of the application module 210. As a result, the necessary libraries have been loaded into the address space of the target process (and specifically of the target application, application module 210) in order for the functions within those libraries to be callable from other code within the application module 210.

The adapter host module 216 maintains a framework heap 312 as a separate, specialized heap for the hooking operations performed by the profiling framework module 214 and the adapter host module 216. This separates the memory used by the application module 210 from the memory used by the profiling framework module 214 and adapter host module 216. The data structures that the adapter host module 216 uses may be allocated from the framework heap 312. In an embodiment, memory used by the various different profiling framework elements (including the profiling framework module 214, the adapter host module 216, and optionally the auto-load profiler library 306 when used) may use the framework heap 312. Similarly, the adapter module 212 may utilize its own specialized heap, profiler heap 314, for the same reasons already mentioned. The adapter host module 216 also carries out other tasks and services, for example providing information about the application module 210 to the adapter module 212, for example the listing of import and export functions.

Within the target process executing application module 210, hook table 302 maintains a listing of hook points within the application module 210—the hook points refer to those locations where one or more target functions are hooked. Table 1 illustrates an exemplary hook table 302 according to an embodiment:

TABLE 1

| Hook ID | Hook Address | Custom Address | Hook Type | Relocated Bytes | Modification Type |
|---|---|---|---|---|---|
| 1000 | 0x7E450838 | 0x00FD0600 | EnterLeave | 5 | 32 rel jump (0) |
| 1001 | 0x7E450400 | 0x00FD0700 | Enter | 8 | 64 abs jump (1) |
| 1002 | 0x7E450480 | 0x00FD0740 | HotPatch | 0 | 32 rel jump (0) |

The profiling framework module 214 may allocate memory for the hook table 302 and update the table as functions are hooked or unhooked. This allows for the hooking of one or more functions to be removed while the process is executing. For example, the hook table 302 may include a unique identifier (such as hook identifier), the address of where the hook was placed, the generated code section location, the hook type, the number of bytes from the original function that were relocated to the generated code section, and a Modification Type field indicating what type of modification was used, such as to indicate if a smaller or larger than 2 GB offset was needed. The Modification Type field may also be used to indicate additional hook types in the future.

The code page 304 represents one or more pages of virtual memory specifically allocated for dynamically generated code (e.g., a generated code section) that is newly generated, for example in response to hooking by the profiling framework module 214.

Additional details of the different modules and elements of FIGS. 2 and 3A, and their interactions and applications, with respect to the remaining figures are discussed below.

Figure 3B:
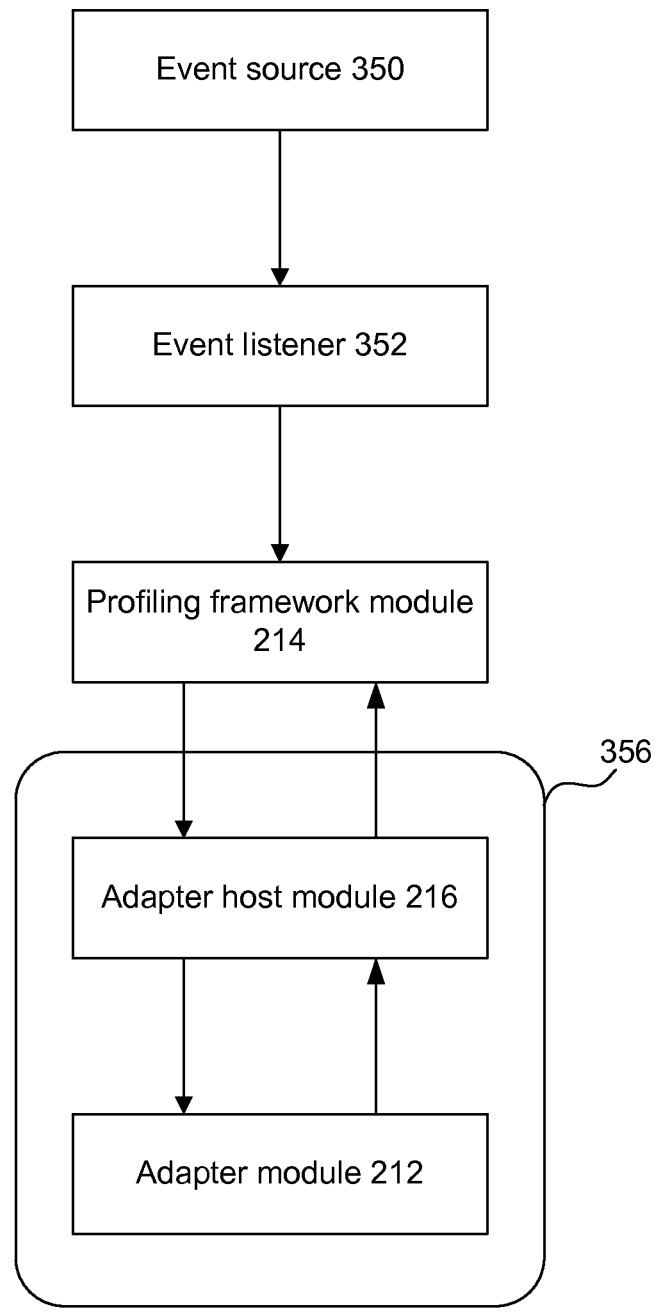
FIG. 3B illustrates an exemplary responsibility hierarchy for the profiling framework architecture according to an embodiment.

FIG. 3B illustrates an exemplary responsibility hierarchy for the profiling framework architecture according to an embodiment. The responsibility hierarchy illustrates an operational relationship between some of the modules discussed with respect to FIGS. 2 and 3A above.

Event source 350 sends event notifications to event listener 352. Events include, for example, a Windows® hook API, Windows® management instrumentation (WMI), or one or more kernel events, just to name a few examples. For example, the starting of a process may cause an event notification to reach event listener 352.

The event listener 352 monitors the events from event source 350. There may be multiple different event sources 350 which event listener 352 monitors. The event listener 352 is useful to help gain knowledge of when a new process has started. Based on those monitored events, the event listener 352 may instruct the profiling framework module 214 to inject the adapter host module 216 into the target process and identify one or more adapter modules 212 to load. Examples of event listeners 352 include, for example, the auto-attach profiler host 318, a kernel mode driver, and an auto-load profiler library.

The profiling framework module 214 receives the instruction from the event listener 352 to inject the adapter host module 216 and to load one or more specified adapter modules 212.

After injection, the adapter host module 216 loads the specified adapter modules 212 (for example, as specified by the profiling framework module 214). The adapter host module 216 provides an interface to the adapter module 212 to retrieve information about the target process.

The adapter module 212, after being loaded, communicates with the adapter host module 216 to obtain information about the target application and determine what code modifications (e.g., for instrumentation or patching) to make to the target application, for example application module 210.

The adapter host module 216 receives the determined hooking points, from the adapter module 212. The adapter host module 216 then conveys this information to the profiling framework module 214 outside of the target process.

When the profiling framework module 214 receives this information from the adapter host module 216, the profiling framework module 214 proceeds with making the requested modifications, as mentioned above and discussed in more detail with the remaining figures below.

Example Hooking Algorithms

Figure 4:
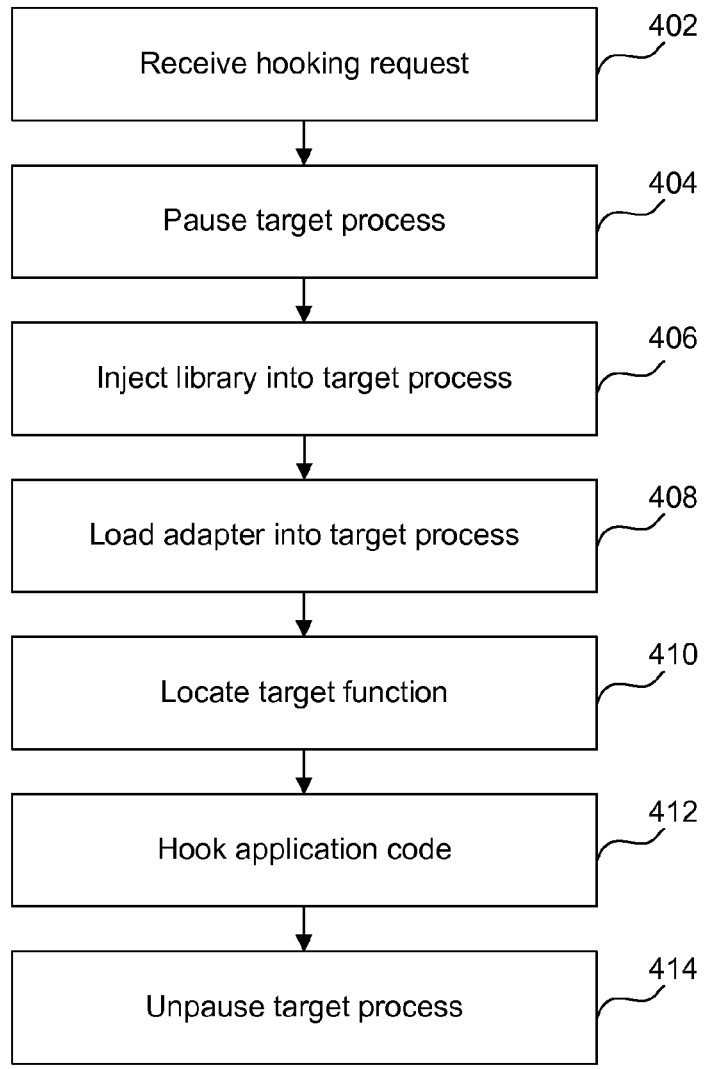
FIG. 4 illustrates an exemplary process for hooking code of an application according to an embodiment.

FIG. 4 illustrates an exemplary process 400 for hooking code of an application according to an embodiment. Although the exemplary process 400 may be performed on any number of computing devices, the following figures will be described with respect to the server 200 of FIG. 2, by way of a nonlimiting example.

At step 402, the profiling framework module 214 receives a code hooking request. In an embodiment, the code hooking request instructs the profiling framework module 214 to hook a function/method/instruction of a target application within a target process. This may also include what adapter or adapters to load. In addition or alternatively, for given applications a specific adapter may have been previously specified to load every time a specified target application initializes or performs a certain, predefined operation.

At step 404, the profiling framework module 214 pauses, or freezes, the target process in which the target application is executing, thereby pausing the target application as well. In an embodiment, this includes pausing all threads within the target process. The target process and target application are suspended so that the targeted code can be modified without causing conflicts with executing code.

For example, in the Windows® environment the profiling framework module 214 may pause the target process using the undocumented NtSuspendProcess function. The NtSuspendProcess function may take one argument, which in an embodiment is the process identifier (PID) of the target process to suspend. The NtSuspendProcess function does not actually suspend the process, but rather all of the threads that currently exist within the target process. This allows the profiling framework module 214 to suspend all of the current threads and then still use another function, such as CreateRemoteThread, to create an additional thread that will run and not be suspended during the hooking process. In another example, in UNIX platforms the profiling framework module 214 may call the ptrace function to attach in order to pause the target process.

At step 406, the profiling framework module 214 injects a library host into the target process and identifies an adapter. In an embodiment, the library host may be the adapter host module 216 and the adapter may be the adapter module 212 of FIG. 2. With the adapter host module 216 injected into the target process, the adapter module 212 may make in-process calls to obtain information such as function call parameters, currently loaded application modules, and names for hook identifiers, to name just a few examples.

At step 408, the adapter host module 216 loads the specified adapter from step 402. In an embodiment, the profiling framework module 214 sends information to the adapter host module 216, such as the specified adapter, which the adapter host module 216 then loads. Each adapter module 212 may specify one or more target functions, methods, machine instructions, line of code, etc.

At step 410, the profiling framework module 214 locates the target function, method, line of code, etc., specified by the adapter module 212. For sake of simplicity of discussion, reference will be made herein to a target function, although the same will apply to target methods, lines of code, etc., as will be recognized by those skilled in the relevant art(s) based on the disclosure herein. There are several different ways in which the target function may be located, in part depending upon how the target function is specified. For example, the adapter module 212 may specify the target function by an address, by function name, by function ordinal, or by symbol name (or any combination thereof). As a part of step 410, the profiling framework module 214 may also follow a forwarding chain of forwarded functions to a root of a call tree, as will be discussed in more detail below with respect to FIG. 6.

At step 412, the profiling framework module 214 hooks the specified application code of the target function located at step 410. In an embodiment, the hooking occurs outside of the target process so as to minimize memory and thread usage by the target application.

Hooking of the application code may include, for example, overlaying of an instruction, such as a JMP instruction, at a hook site. The JMP instruction directs the application to a new code location for execution, instead of executing the original, overwritten instructions. The new code location may be one or more pages of read/write/executable virtual memory allocated by the profiling framework module 214. For hooked code, the profiling framework module 214 may write the original, overwritten instructions to the newly allocated virtual memory, e.g. a generated code buffer, so the overwritten instructions may still be executed after a call to the adapter host module 216 function, which sends an enter notification to the adapter module 212. In an embodiment, the profiling framework module 214 also adds an instruction to the instructions in the newly allocated virtual memory to return the execution path to the next valid instruction in the original application code.

At step 414, the profiling framework module 214 unpauses the target process in which the target application is executing, thereby unpausing the target application as well. Prior to unpausing the target process, the profiling framework module 214 may terminate any additional threads that were used for hooking so that the target process may resume with the same number of threads in use before hooking. The target process and target application then resume regular operation with the modified, hooked code available for execution when called. For example, in the Windows® environment the profiling framework module 214 may unpause the target process using the undocumented NtResumeProcess function, which resumes all threads that had been paused.

Embodiments of the present disclosure may additionally be used with existing approaches that instrument managed code. One API to instrument managed code is bundled with the Microsoft .NET Framework. This can be accomplished through the use of interfaces such as ICorProfilerCallback and ICorProfilerInfo. While these interfaces allow for instrumenting managed code, they do not provide any insight into the native API calls used by the managed functions or by the runtime itself. Embodiments of the present disclosure may be used in conjunction with managed instrumentation code to provide a complete picture of these applications. Tracking both managed and native code execution allows for truly seeing how a managed application interacts with the runtime as well as the operating system and any other native libraries. This even includes code that straddles boundaries of managed and native code such as JNI and C++/CLI.

It is also possible for embodiments of the present disclosure to instrument compiled managed code that has been JIT compiled from managed code. This is true for both Java, .NET, as well as any other managed environment that eventually becomes compiled into native code. One interesting use is to allow managed code profilers the ability to dynamically select code to instrument after the JIT compilation process has already occurred. This is useful because after the managed code is compiled it is normally not re-JITed. The normal instrumentation process of managed code involves adding additional managed code to the byte code or CIL either manually from the profiler or from the profiling framework provided by Microsoft®. This is why, once a profiler indicates to Microsoft's profiling framework to not instrument a particular method, it cannot later be instrumented as it has already been compiled and the chance to add the extra managed code has been missed.

Using the profiling framework module 214 with the adapter host module 216, which operates at the machine code level, a method can be instrumented after it has already been JIT compiled. This allows profilers to dynamically select what methods to compile throughout the lifetime of the application and not just on startup. This same functionality also allows profilers to target other managed environments that do not provide a profiler framework.

In addition, embodiments of the present disclosure may also be used to dynamically instrument a target application based upon some metric. Existing tools may be able to observe a change in resource utilization, such as CPU usage, but cannot determine what the target process was actually doing. The profiling framework module 214 may determine that a target process should be instrumented when the process uses an amount of a resource, such as CPU usage, beyond some threshold to name just one example.

Instead of just identifying the process, in an embodiment the profiling framework module 214 may begin automatic instrumentation of that process, since the profiling framework module 214 may attach to a process that is already running. An adapter module 212 using the framework may also retrieve the current thread stacks from the profiling framework module 214, via the adapter host module 216, when the target process is paused. The adapter host module 216 may retrieve this information in much the same manner as hijacking a thread. Since the threads are suspended, the adapter host module 216 can call either the ptrace system (on UNIX platforms) call to get the current registers and call stack or, if within a Windows® environment, the Win32 GetThreadContext. This allows for determining what code is currently executing and may give some hints about what code to instrument. The adapter module 212 may select the code to instrument and return and the process may then be unpaused. The hooked code of the instrumented application may then be removed once utilization retreats from the previously-determined threshold.

Different steps of process 400 will be discussed in more detail below with respect to FIGS. 5-9.

Beginning Application Code Modification

Figure 5A:
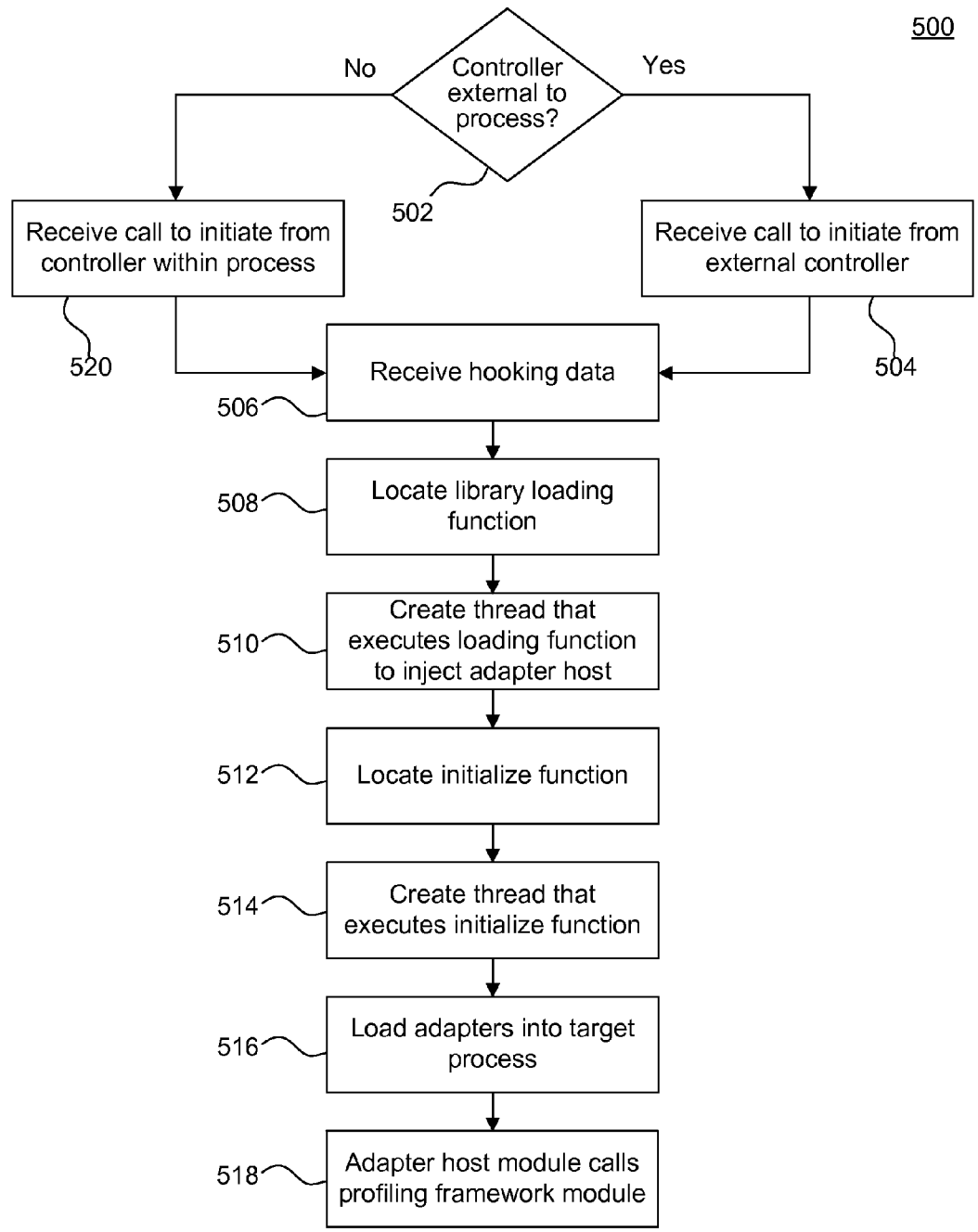
FIG. 5A illustrates an exemplary process for initiating code hooking according to an embodiment.

FIG. 5A illustrates an exemplary process 500 for initiating hooking of application code according to an embodiment where the necessary operating system functions are already available. Process 500 may be an embodiment of step 402 of FIG. 4 and may be performed by the server 200 of FIG. 2. In an embodiment, the profiling framework module 214 of server 200 performs the process 500.

The process 500 proceeds to step 504 from step 502 if the profiling controller is external to the target process. In an embodiment, a "profiling controller" herein refers to a library, application, or other resource that can place a call to the profiling framework module 214 to initiate a hooking process.

At step 504, the profiling framework module 214 receives a call to initiate hooking of the target process from the external controller, for example from the profiling controller application module 316. Any external controller may be used, including a kernel mode driver or a profiling controller developed by a third party.

At step 506, the profiling framework module 214 receives hooking data from the external application, which indicates to the profiling framework module 214 the target process to hook. For example, the hooking data may specify the PID, as well as what adapter module 212 to use. The hooking data may also include a payload, which may contain additional data in a format that the adapter module 212 is able to process. The payload may indicate to the adapter module 212 what types of functions to hook. The payload may otherwise include any initialization data useful for the adapter module 212.

In an embodiment, the adapter module 212 is indicated by either a file path or by a Universally Unique Identifier (UUID) or a Globally Unique Identifier (GUID) on Windows®.

At step 508 the profiling framework module 214 locates a function used to load a library, such as the LoadLibraryW function, a Win32 API that may reside within Kernel32.dll. As part of step 510, the profiling framework module 214 may determine the base address of a dynamic library which contains the LoadLibraryW function, such as Kernel32.dll, within the target process. The profiling framework module 214 determines the base address of the dynamic library, instead of assuming a well-known address, to avoid any possible address discrepancies in case the dynamic library utilizes relocatable code.

Relocatable code describes the ability to place a chunk of binary code at an arbitrary location within a process. This may occur with the use of dynamic libraries since they are loaded into the address space of a process in order for the functions within the dynamic library to be callable from other code within the process. The starting location of the dynamic library, after its placement within the address space, may be referred to as the dynamic library's base address. It is possible that the base address will not always be the same each time the dynamic library is loaded.

For example, a base address might change to solve an addressing conflict. A dynamic library may have a preferred load address or a fixed address attribute specified. The preferred load address may indicate to the operating system loader that the library should load at this address if possible. The fixed address may indicate that the library should load at the fixed address or not at all. The operating system loader determines at what address to position the dynamic library. Each library is loaded at a unique base address within a given process so that it does not overlap another already loaded library within the process's address space. If another library has already been loaded at an address designated as the preferred base address of the dynamic library to be loaded, then the operating system loader will not load the dynamic library to be loaded at its preferred address. If the dynamic library is later reloaded, there is no guarantee that it would be reloaded at the same address as when previously loaded.

As another example, the server 200 may use Address Space Layout Randomization (ASLR) to hinder attackers that write malicious code. ASLR may be used to randomly arrange the position of several items within the process address space, such as libraries and the stack. ASLR uses randomized base addresses to prevent the use of well-known or easily predictable addresses, since well-known/predictable addresses are more susceptible to attackers. The address used by the attacker is a lot easier to provide if the function to be called resides in a library that is always loaded at the same location or the location is easy to predict. ASLR avoids this by decreasing the predictability of where the library will be located within the address space.

Returning to step 508, the profiling framework module 214 may determine the base address of the dynamic library since the dynamic library may have been loaded at a different address within the target process than expected. Using Kernel32.dll again as an example, the profiling framework module 214 may use several other Win32 API calls to locate the base address. Those skilled in the relevant art(s) will recognize that other functions may be used to determine the base address within other operating system environments.

In an embodiment, the profiling framework module 214 may use the CreateToolhelp32Snapshot function with a TH32CS_SNAPNMODULE argument and the PID of the target process. These arguments indicate that the profiling framework module 214 is interested in the loaded modules of the process with the specified PID. After calling the CreateToolhelp32Snapshot function, the Module32First function may be used within a loop until locating a module name match to the dynamic library, for example kernel32.dll. When the kernel32.dll module is found, the profiling framework module 214 may obtain the dynamic library's base address from the returned MODULEENTRY32 structure.

In addition, the profiling framework module 214 may locate the relative virtual address of the library loading function, for example LoadLibraryW function, within the dynamic library. The relative virtual address may sometimes be referred to as a relative offset of the function.

As with the base address of the dynamic library, the profiling framework module 214 does not assume that the same address is used each time the dynamic library is loaded. In an embodiment, the profiling framework server 214 may use any of an export address table (EAT), an export ordinal table (EOT), or an export name table (ENT) to locate the LoadLibraryW exported function. The use of these tables to locate function addresses will be discussed in more detail below with respect to FIG. 6, with the difference that the inspection at step 510 is done from a remote process, not within the target process as discussed with respect to FIG. 6.

With the function located, the profiling framework module 214 obtains the relative virtual address of the located function and adds the relative virtual address value to the dynamic library's base address within the target process. This results in the full address of the LoadLibraryW function within the target process.

Once the library loading function, such as LoadLibraryW, has been located within the target process, the process 500 proceeds to step 510. The profiling framework module 214 also allocates enough virtual memory within the target process to contain a path to the library host module 216, the path to the adapter module 212, and the optional payload. In an embodiment, pages of the allocated virtual memory have read and write protection assigned so that data can be written to them. In an embodiment, the profiling framework module 214 may write the path to the adapter host module 216 into one or more pages of the newly allocated virtual memory using the Win32 WriteProcessMemory function.

At step 510 the profiling framework module 214 creates a thread in the target process that executes the library loading function located at step 508 within a library, for example the Kernel32.dll library. In an embodiment, the profiling framework module 214 uses the CreateRemoteThread function available from the Win32 API to call LoadLibraryW in order to execute the LoadLibraryW function. Some parameters of the call to CreateRemoteThread may be the located address of the library loading function and an address located within the target process to the path of the library to be loaded, which may be the adapter host module 216. The profiling framework module 214 then waits for the thread created at step 510 to complete execution of the LoadLibraryW function. In an embodiment, the profiling framework module 214 may use the WaitForSingleObject function to wait for the thread executing the function. In this manner, the profiling framework module 214 injects the adapter host module 216 into the target process.

With the specified adapter host module 216 loaded, the process 500 proceeds to step 512, where the profiling framework module 214 locates an initialization function, such as PH_Initialize. In an embodiment, the profiling framework module 214 follows the same steps to locate the function as discussed above with respect to step 508. The profiling framework module 214 may write the path to the adapter module 212 and the payload to the remote memory using WriteProcessMemory.

At step 514, the profiling framework module 214 creates a thread in the target process that executes the initialization function located at step 514 within the adapter host module 216. In an embodiment, the profiling framework module 214 uses the CreateRemoteThread function available from the Win32 API to call PH_Initialize, which also takes one parameter for a thread start procedure, in order to execute the PH_Initialize function. The single parameter may be a structure containing the adapter module 212 and payload. The profiling framework module 214 waits for the thread created at step 514 to complete execution of the PH_Initialize function. In an embodiment, the profiling framework module 214 may use the WaitForSingleObject function to wait for the thread performing the initialization. In an embodiment, after the WaitForSingleObject function returns, the profiling framework module 214 may use the Win32 ReadProcessMemory function to read a value from the remote structure at the offset of a member containing a return value. This value may be used to determine whether the initialization process failed or succeeded.

Although the discussion above centered on the CreateRemoteThread function, it is alternatively possible to achieve the same result using the Win32 API GetThreadContext. Using the GetThreadContext and SetThreadContext functions, it is possible to use (or hijack) one of the already existing threads to call the adapter host module 216's PH_Initialize function. For this to execute safely, all of the threads are suspended. The profiling framework module 214 may do this later on in the hooking process. The profiling framework module 214 may use the GetThreadContext function on one of the threads to be hijacked. The GetThreadContext function may be used to retrieve current values of the registers on the thread to be hijacked, which may be saved. The instruction pointer may then be set at the located address of the function to execute using the SetThreadContext function, which in this case may be LoadLibraryW or PH_Initialize. Once set with the parameters written to the thread's stack, the profiling framework module 214 may then resume the hijacked thread and let it execute until the instruction pointer is at the end of the function, at which time the profiling framework module 214 then restores the thread's context using SetThreadContext with the previously saved values of the registers.

For UNIX and UNIX-like platforms which do not have the CreateRemoteThread function, another approach may be taken to achieve the same process. In UNIX, the ptrace system call may be used in place of the various Win32 functions discussed above. It is important to note that on Windows® the profiling framework module 214 does not attach as a debugger. This allows the profiling framework module 214 to work even on processes that are being debugged. Table 2 shows some of the equivalent calls between WIN32 and UNIX systems:

TABLE 2

| | |
|---|---|
| NtSuspendProcess or DebugActiveProcess | ptrace with PTRACE_ATTACH |
| WriteProcessMemory | ptrace with PTRACE_POKETEXT or PTRACE_POKEDATA |
| GetThreadContext | ptrace with PTRACE_GETREGS or PTRACE_GETFPREGS |
| SetThreadContext | ptrace with PTRACE_SETREGS or PTRACE_SETFPREGS |

At step 516, the adapter host module 216 loads the specified adapter module 212 into the target process.

At step 518, the initialization function being executed by the adapter host library 216 calls the profiling framework module 214 to begin hooking the identified points of the target application, for example as described in the other steps in the hooking process 400 of FIG. 4.

Returning to decision step 502, if the profiling controller is internal to the target process, the process 500 proceeds to step 520.

At step 520, the profiling framework module 214 receives a call to initiate hooking of the target process from the internal controller. An example of an in-process controller may be the Windows® hook, which has previously injected an auto-load profiler library, such as optional auto-load profiler library 306, into the target process.

The process 500 proceeds from step 522 to steps 506 through 520, as discussed above.

Figure 5B:
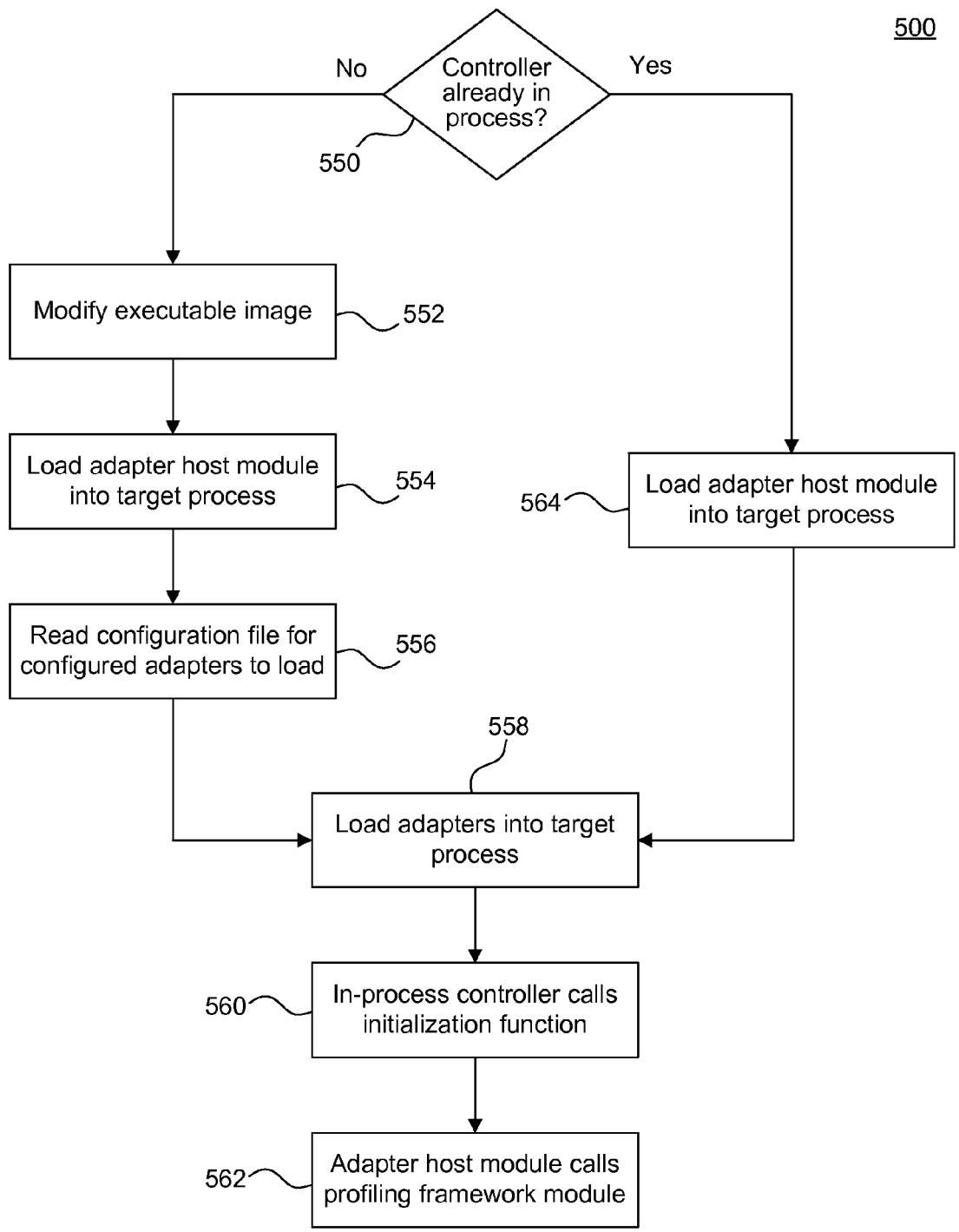
FIG. 5B illustrates an exemplary process for initiating code hooking according to an embodiment.

FIG. 5B illustrates an alternative exemplary process 500 for initiating hooking of application code according to an embodiment where the necessary operating system functions are not already available. Process 500 may be an alternative embodiment of step 402 of FIG. 4 and may be performed by the server 200 of FIG. 2. In an embodiment, the profiling framework module 214 of server 200 performs the process 500. The necessary operating system functions may not be available already, for example, due to restricted security or when the given platform does not support those functions. One example may be on mobile devices.

If, at decision step 550, an in-process profiling controller does not already exist, the process 500 proceeds to step 552.

At step 552, the profiling framework module 214 modifies an executable image of the target application. For example, this modification may be made directly to the portable executable (PE) file, executable and linkable format (ELF) file, or some other type of executable image file. The modification causes the executable image to import an auto-load profiler library, such as library 308, into the target process. The auto-load profiler library functions as an in-process profiling controller.

After the executable image has been modified, the process 500 proceeds to step 554, where the in-process controller loads the adapter host module 216 into the target process.

At step 556, the auto-load profiler library 308 reads a configuration file that is used to determine what adapter module(s) 212 to load into the target process.

At step 558, the adapter host module 216 loads the specified adapter module(s) 212 into the target process.

Once the adapter module(s) 212 are loaded, the process 500 proceeds to step 560, where the in-process profiling controller calls an initialization function within a library of the adapter host module 216, for example PH_Initialize discussed above with respect to FIG. 5A.

At step 562, the initialization function being executed by the adapter host library 216 calls the profiling framework module 214 to begin hooking the identified points of the target application, for example as described in the other steps in the hooking process 400 of FIG. 4.

Returning to decision step 550, if an in-process profiling controller does already exist, the process 500 proceeds to step 564.

At step 564, the in-process controller loads the adapter host module 216 into the target process, as discussed above with respect to step 554. After the adapter host module 216 is injected into the target process, the process 500 proceeds to steps 558 through 562 as discussed above. Hooking of identified points of the target application may then proceed as discussed with respect to FIG. 4.

Locating Library Functions

Figure 6:
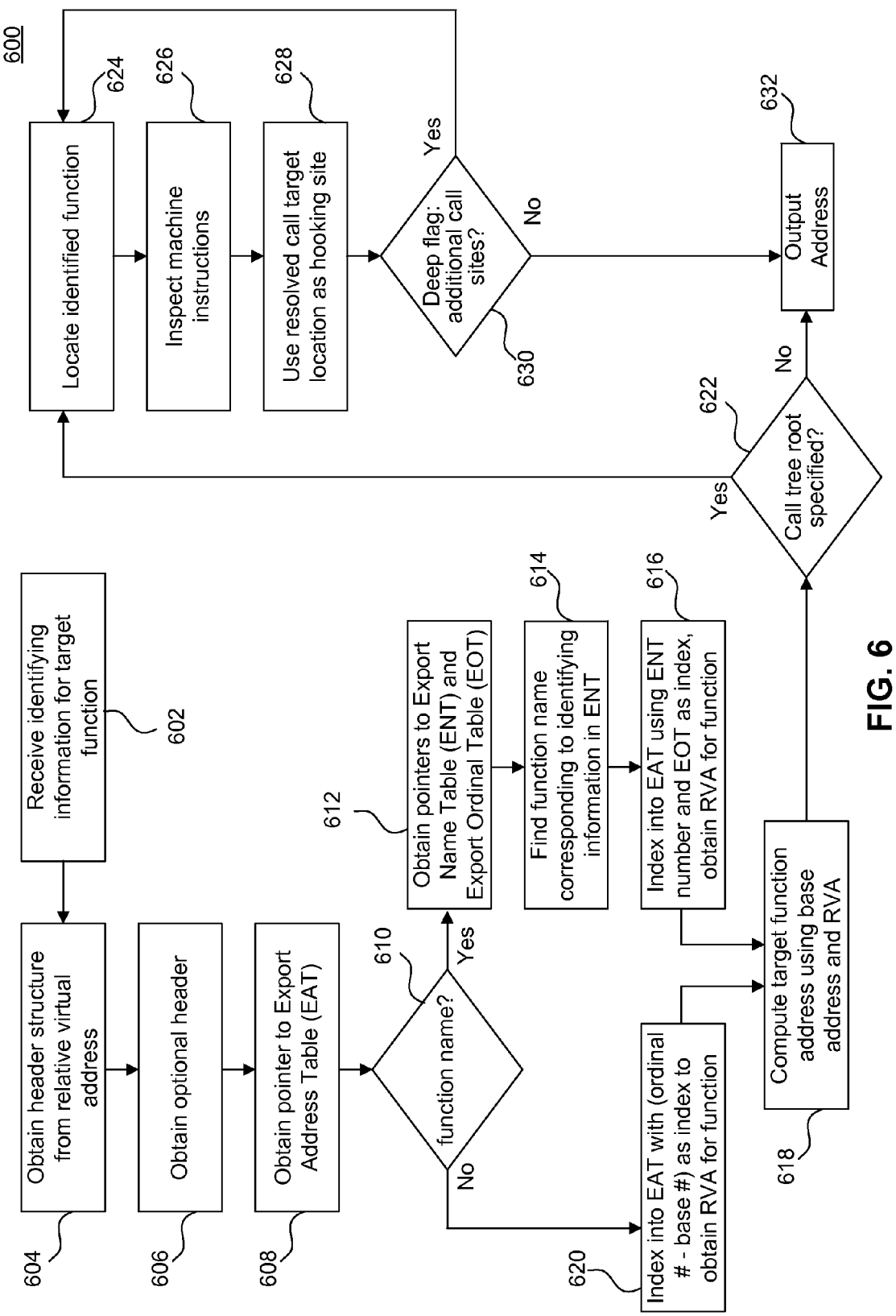
FIG. 6 illustrates an exemplary process for locating a function address according to an embodiment.

FIG. 6 illustrates an exemplary process 600 for locating a library function address according to an embodiment. Process 600 may be an embodiment of step 410 of FIG. 4 and may be performed by the server 200 of FIG. 2, for example by the profiling framework module 214 in conjunction with the adapter host module 216 and the adapter module 212 operating within the target application.

At step 602, the profiling framework module 214 receives identifying information for a target function, for example from the adapter module 212 via the adapter host module 216. In an embodiment, the target function specified by the adapter module 212 may be an imported function or an exported function, or multiple target functions may have been specified that include any combination of imported and exported functions. For example, within the Windows® environment functions may be exported by name and/or ordinal within a PE file. In Visual Studio the NONAME attribute may be specified within a module definition (.DEF) file to export a function by ordinal without a name. In addition to exporting by name or ordinal, a function may be imported by name or ordinal. Importing by ordinal may be used if the developer has control over the library being imported, since it is possible for ordinals to change in later builds, resulting in a previous ordinal value pointing to a different exported function. Exporting by ordinal may be used to reduce the size of the PE file because the function names are not included, and may also be used to prevent other parties from learning the function names (and thereby the purpose of the functions).

In an embodiment where the function is a forwarding exported function, the profiling framework module 214 may follow the forwarding chain to the end of the chain. For example, Windows® allows for exported functions to forward to another library's function. Forwarding allows the first library to act as an alias to another function. A forwarded function has, within its entry in the PE file the name of the library and function to which it forwards. It is possible for a forwarding function that is forwarded to a subsequent function to then again forward to another function, and so on in a forwarding chain. By following the forwarding chain to the end, the profiling framework module 214 resolves the address as the address of the function at the end of the forwarding chain. This address, due to the forwarding references, is deemed the address of the originating alias function. An example of a forwarded exported function is kernel32.dll library's AcquireSRWLockExclusive function. This function is forwarded to ntdll.dll library's RtlAcquireSRWLockExclusive function. The entry within the PE file has the format of "NTDLL.RtlAcquire SRWLockExclusive." Other examples are possible as well, as will be recognized by those skilled in the relevant art(s).

At step 604, the profiling framework module 214 obtains a header structure through a relative virtual address lookup. In an embodiment, this header structure may be an IMAGE_NT_HEADERS structure and may be obtained by going to the base address of the library from which the function is being exported. For example, the PE format begins with an IMAGE_DOS_HEADER at the base address.

At step 606, the profiling framework module 214 obtains an optional header, for example through the OptionalHeader member of the header structure obtained at step 604.

At step 608, the profiling framework module 214 obtains a pointer to the export address table. This may be obtained, for example, by locating the IMAGE_EXPORT_DIRECTORY within the sections obtained at steps 604 and 606.

As mentioned above, a function may be located by name or by ordinal. At step 610, the profiling framework module 214 determines whether the identifying information received from the adapter module 212 includes a function name or not. If the identifying information includes a function name, then the process 600 proceeds to step 612 to locate the function by name.

At step 612, the profiling framework module 214 obtains pointers to the export name table (ENT) and the export ordinal table (EOT).

At step 614, the profiling framework module 214 locates the function name within the ENT that corresponds to the function name from the identifying information. In an embodiment, the profiling framework module 214 may loop through the ENT until the name is located within the ENT.

After the name is located in the ENT, at step 616 the profiling framework module 214 indexes into the export address table (EAT) using the ENT index number and the EOT as an index value into the EAT. For example, the index of the ENT entry corresponding to the matching name may be used as an index to the EOT, and the indexed EOT may itself be an index into the EAT, such as EAT[EOT[ENTindex]]. In this manner, the relative virtual address (from the library's base address) of the target function is located.

At step 618, the profiling framework module 214 adds the relative virtual address with the library's base address. This is determined to be the target function's address within the address space of the target process.

At step 622, the profiling framework module 214 determines whether the identifying information from the adapter module 212 specifies a function that the adapter module 212 seeks to evaluate as a call tree root node, for example through static analysis. Along with this function, the adapter module 212 also specifies a flag that indicates a desire to hook all of the functions called by the function evaluated as the call tree root node.

If a function is not specified as a call tree root node, then the process 600 proceeds to step 632, where the determined address for the target function is output for use in hooking the application code.

Returning to decision step 622, if a function is specified as a call tree root node, the process 600 proceeds to step 624.

At step 624, the profiling framework module 214 locates the identified function. The adapter module 212 may specify the function by an address, function ordinal, or function name, to name a few examples. Further, the function may be identified in a call from another function within the call tree.

At step 626, the profiling framework module 214 uses a profiling framework disassembler to inspect machine instructions of the target application from the identified function. The profiling framework module 212 may record CALL or equivalent instructions while inspecting the target application's instructions.

At step 628, the profiling framework module 214 uses a resolved call target location as new hooking sites for code modification. The call target location may be resolved through the use of a direct address, relative address, or a relative address to a jump table such as the import address table (IAT).

The profiling framework module 214 determines at step 630 whether a deep flag was specified in the call. A deep flag indicates that each additional function found to be called would be inspected for additional call sites, repeated until all nodes and leaves have been searched. If a deep flag has been set, then the profiling framework module 214 may then move on to those functions to locate the next called function at step 624, and proceed through steps 624 to 630 until the end of the call tree is reached. This allows for deep instrumentation/patching of the target application without requiring much work or domain knowledge by the adapter module 212. Steps 624 through 630 may be useful, for example, where it is unknown beforehand what function or functions are desirable to be hooked.

After the search has terminated, the process 600 proceeds to step 632 where the determined address(es) is output for use in hooking.

Returning to step 610, if the identifying information includes an ordinal instead of a name, then the process 600 proceeds to step 620 to locate the function by ordinal.

At step 620, the profiling framework module 214 indexes into the EAT using the ordinal as a basis for the index value. In an embodiment, the profiling framework module 214 subtracts the export directory base number from the ordinal number as the index value into the EAT. In this manner, the relative virtual address (from the library's base address) of the target function is located.

The profiling framework module 214 then proceeds again to step 618, where the target function's address is determined to be the combination of the relative virtual address value and the base address of the library.

The process 600 then proceeds to decision step 622, as discussed above.

The process 600 for locating library functions also works for system functions. System functions are implemented within libraries that are imported into the target application. However, some system functions eventually switch the central processing unit (CPU) of a processor into privileged mode through the use of an interrupt or a SYSENTER instruction and then execute kernel code. This process may occur within a wrapper function that is exported from the system library. In such an embodiment, the wrapper function may provide the hooking site for the profiling framework modules 214. Because system functions are implemented as libraries, the process can also involve call forwarding. As a result, it is possible that an imported function may not appear, based on the library it resides in, to be a system call. However, the imported function may actually be forwarded to a lower level library which does perform a system call. This would not matter to profiling framework module 214 because it can follow the forwarding chain to the end.

The process 600 generally laid out the approach for locating target functions that are imported or exported functions. The profiling framework module 214 may also be used to locate internal or non-exported functions. The profiling framework module 214 may receive a function name from the adapter module 212 via the adapter host module 216 and the profiling framework module 214 will do the work of resolving the address. Unlike the imported or exported functions (where names are provided within the PE file), the profiling framework module 214 uses symbols to locate the function from a symbol name. The symbol name may be any valid symbol name. When symbols are not available, the adapter module 212 (for example which has additional domain-specific knowledge) may provide addresses directly to the profiling framework module 214 to hook internal functions.

As just one specific example of locating internal functions, the profiling framework module 214 may be used to locate an internal function within a JNI. Here, specific domain knowledge may be used to provide meaningful function names. In this embodiment, JNI makes use of interfaces that are exposed through a few exported functions. While the interfaces can be obtained through the few exported functions, the interfaces themselves may not contain exported functions. Since these functions are not exported, the names of these functions are not included within the JNI's binary file. On the other hand, the interfaces are documented and are exposed through several header files included within the Oracle Java Development Kit (JDK). A specialized adapter module 212 for JNI may locate the interfaces easily through the use of the exported functions found in the java virtual machine (JVM) library. After obtaining these interfaces, the adapter module 212 will know what functions are available due to inclusion of the necessary header files from the JDK. The adapter module 212 may then specify the address of the interface function along with the associated documented function name to the profiling framework module 214.

Another specific example involves the hooking of component object model (COM) interfaces, for example implementations that support the automation interface IDispatch. The IDispatch interface may be used to provide a COM specific adapter for generic libraries that use COM. COM libraries export a DllGetClassObject function that is used, usually indirectly, by callers to obtain a class object of a specific type of object. From the class object interface returned, an instance may be obtained of a desired object through the interface. That object may also support the IDispatch interface (which was designed for automation and late binding). The IDispatch interface allows for callers to obtain type information or meta-data about the object since it was designed for late-binding languages such as Visual Basic. The IDispatch interface provides a function called GetTypeInfo that returns an ITypeInfo pointer. From this interface, meta-data retrieval functions such as GetNames can be called. With the use of these functions, the adapter module 212 may provide function addresses and names to the profiling framework module 214 for hooking and instrumentation even though the functions were not exported.

In an embodiment, process 600 may also correctly identify actual code within a code section of an executable file from data. It is not uncommon for compilers to also place variables within a code section. Because compilers may blend code and data into a code section, the profiling framework module 214 may not blindly disassemble an entire code section and consider it all as code. In an embodiment, the profiling framework module 214 avoids the complications of searching through an entire code section, since for dynamic libraries the complete interface must originate from exported functions after which internal functions can be called. As a result, anything the application or another library is able to call originates from an exported function. Traversing these call trees from exported functions allows for a more complete view into the internal workings of a library. While these functions will be correctly identified and hooked, the names will not be available unless symbols are available because the internal function names will not be included within the executable. If symbols are available, the symbols will be used to identify the names of the functions. Also, if the adapter module 212 has some domain knowledge and is able to resolve the names of some internal functions, the adapter module 212 may provide a name to the profiling framework module 214 via the adapter host module 216 for association.

In embodiments where the machine instructions are directly hooked, the adapter module 212 provides an address to the profiling framework module 214 via the adapter host module 216. Locating a machine instruction address may be accomplished by either the adapter module 212 locating an address of interest, for example by using the disassembler provided by the profiling framework module 214 and adapter host module 216, or alternatively be supplied by a user.

In certain embodiments, it may be desirable to choose to hook functions that are not exported from a library either because the library was written in-house or it is desirable to obtain a deeper knowledge of the library or application. If symbols for the application module are obtainable, then meaningful function names can be presented and used, depending upon the level of symbols available to the profiling framework module 214. In the event that symbols are not available, the profiling framework module 214, and ultimately the adapter module 212 itself, will report module addresses in the format of something similar to user32.dll:: 0x400. Depending upon what information one is trying to obtain from the internal functions, this might be enough information.

This may be enough information, for example, where a library is a third party library being used by an in-house application. If the application is calling into the library, then the function the application is calling must be exported in some manner. It could be exported by name or ordinal. If it is a third party library that is intended to be used by others, most likely the functions will be exported by name. As an example, if the application exhibits a considerable delay during an operation, the profiling framework of the present disclosure may be used to hook code of one or more functions of the application, including the functions of the third party library.

Within the application the delay is occurring during the call to the third party library function. The profiling framework module 214 may report a call tree showing the interaction between the application and the third party library function. This call tree indicates that a specified function is taking a considerable amount of time to execute. Since the profiling framework module 214 also hooked code of the private functions called by the exported, specified function, the private functions represented by function start address are visible within the call tree. The exported, specified function may call multiple functions. It is not necessary to know the name of the called function that is taking the majority of time to execute because it was not written in-house. It is sufficient to report to the library vendor that the specified function is not performing well, and perhaps also the address of the internal function.

Alternatively, it is also possible for an in house library to cause issues. In this situation, the function names may be obtained from the symbols from the build although the function name may again not be necessary. For an in-house library, the symbols may be available on an in-house server. A customer may report an issue by presenting a call tree that shows the internal function that is not performing well. The developer in-house that receives the issue can look up the function at the specified relative virtual address within the in-house library and determine the function. This is possible using the symbols and several tools on the market today, however, these tools require a manual process to resolve the address and in most cases the RVA is not used but instead the full address is needed. Embodiments of the present disclosure provide Automated Resolution of Internal Addresses for these situations.

If the library's symbols and the profiling framework are available, then the addresses reported from a remote environment can be automatically resolved to function names. The profiling framework module 214 may perform this step without a debug process and manually performs the calculation of the full address by adding the reported relative virtual address to the module's base load address.

Modifying Original Application Code

Since hooking the target application code in embodiments of the present disclosure occurs at the instruction (e.g., machine code) level, modifications are CPU specific. While the process is generally the same for any CPU, the changes to the instructions are made in a CPU-specific manner. In order to make modifications at the instruction level, the profiling framework module 214 uses the profiling framework disassembler to disassemble the machine code into the current processor architecture specific instructions, which can be evaluated. Because of this, the profiling framework module 214 determines if the executable file is 64-bit or 32-bit by the information included within the executable file. This is applicable for both PE files on a Windows® platform as well as ELF files on a UNIX or UNIX-like platform.

Some processors use variable length instruction encodings. The popular Intel® x86 family is just one example of a variable length instruction processor. The x86 family uses instructions that are variable in length based on a number of factors including the instruction itself, indexing used, and parameters whether they are memory or registers. This is also true for the x86 compatible AMD64 architecture.

Some processors use fixed length instructions. In these embodiments, no matter what the instruction type or parameters used, the instruction is always the same length. These processors make the hooking easier for the profiling framework module 214, as the replacement of instructions is a simple one-to-one instruction overlay.

Figure 7:
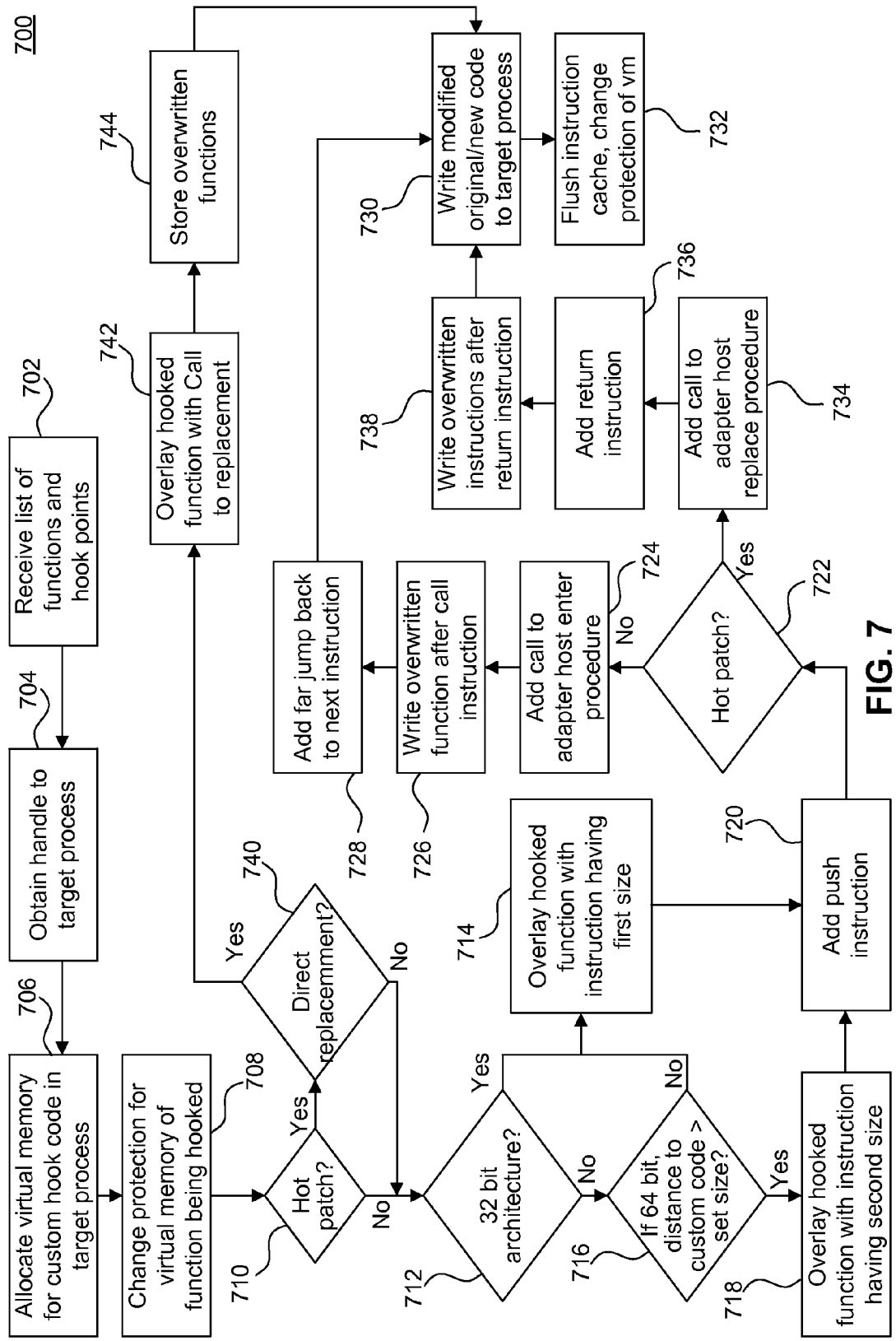
FIG. 7 illustrates an exemplary process for hooking application code according to an embodiment.

FIG. 7 illustrates an exemplary process 700 for hooking application code according to an embodiment, which takes into consideration CPU-specific instructions and fixed or variable length instructions. Process 700 may be an embodiment of step 410 of FIG. 4 and may be performed by the server 200 of FIG. 2, for example by the profiling framework module 214.

At step 702, the adapter host module 216 receives a list of functions and hook points within the target application code from the adapter module 212. The adapter host module 216 may then convey the PID, address containing the information used to perform the hook, and the size of the data to the profiling framework module 214 outside the target process. The specified hook may be in the form of a unique hook identifier. The size of the hook identifier may be the same size as the address size of the CPU architecture used by the target process. For example, if the CPU is 64-bit but the application is 32-bit, then the hook identifier will be 32 bits in size. The hook identifier may be used to report to the adapter module 212 what hook is being executed at any given time. The hook identifier, rather than an address, is used for several reasons. For example, based on module load location, the address will be different from one instance to another. The standard identifier allows for the same identifier to be used regardless of the base load location of modules.

At step 704, the profiling framework module 214 obtains a handle to the target process to read/write data in the target process. In an embodiment, the profiling framework module 214 may use the Win32 OpenProcess function to obtain the handle and read the data at the address specified using the Win32 ReadProcessMemory function. Within the target process, the profiler host may be allocated within a host-specific heap, such as framework heap 312 of FIG. 3, to avoid tracking of that memory for the target process.

At step 706, the profiling framework module 214 allocates virtual memory within the target process for the custom hook code. In an embodiment, the profiling framework module 214 may use the VirtualAllocEx function.

The newly allocated virtual memory page (or pages) is read/write/executable virtual memory. This process of allocating executable virtual memory pages may be the same as what other frameworks do to provide JIT compiled code where the newly compiled code needs to reside somewhere in process. While the APIs for allocating additional virtual memory vary across operating system platforms, the underlying process is the same. The profiling framework module 214 allocates enough pages to include a small set of instructions for each hook. The amount of actual pages may be the number of hooks specified at step 704, multiplied by the hook section size, rounded up to the next page boundary.

Since the newly allocated virtual memory pages are marked as executable, the dynamically generated code may execute with Data Execution Prevention (DEP) enabled whether implemented at the operating system level, such is the case of Windows® when using 32-bit processors, or at the processor level for more advanced 64-bit processors. DEP is used to prevent attackers from executing malicious code that is stored in virtual memory pages marked as non-executable. Without DEP in place, an attacker could place instructions within data pages and attempt execution of those instructions by performing a JMP or something similar to the location of the malicious code within the data pages.

At step 708, the profiling framework module 214 changes the protection of the virtual memory where the original code to be hooked is stored to read/write/execute. In an embodiment, the profiling framework module 214 may call the Win32 API VirtualProtectEx function to change the protection. Changing the protection to allow for write access allows profiling framework module 214 to be able to modify the existing function instructions in the target application.

At step 710, the profiling framework module 214 determines whether the adapter module 212 specified a hot patch hook for the target application. If the adapter module 212 does not specify a hot patch, the process 700 proceeds to step 712.

At step 712, the profiling framework module 214 determines whether the CPU architecture on which the target process is executing is a 32 bit architecture or not (or, for a 64 bit CPU architecture, whether the target application is still 32 bit). If the target application's CPU architecture (or target application itself) is 32 bit, the process 700 proceeds to step 714.

At step 714, an instruction set having a first size is overlaid on the original code at the identified hook point. For example, the profiling framework module 214 may modify the original code in a temporary buffer that is later written back to the target process along with code generated in a generated code buffer, if any. In an embodiment, the first size corresponds to a 32 bit CPU architecture. For example, the instruction may include a JMP instruction, which directs a jump to a new code location for execution (e.g., to generated code described below located in the newly-allocated virtual memory) instead of executing the original instructions that are overwritten. In an embodiment, the overlay of the JMP is the only modification to the original code. An example of modification may be seen in the sample code below:

```
USER32!MessageBoxExW:
    7e450838 8bff              mov       edi,edi
    7e45083a 55                push      ebp
    7e45083b 8bec              mov       epp,esp
    7e45083d 6aff              push      0FFFFFFFFh
Original Code before Modification
USER32!MessageBoxExW:
    7e450838 e9c3fdb782        jmp       00fd0600
    7e45083d 6aff              push      0FFFFFFFFh
After Modification
```

Since the x86 family allows for variable length instructions, the JMP instruction has overwritten the original MOV, PUSH, and MOV which occupy the five bytes needed for the JMP instruction. While in the above sample code the MOV, PUSH, and MOV instructions combined make up the exact five bytes needed for the JMP, it is possible that other instructions may occupy more bytes as shown below:

```
msvcrt!scanf:
   77c41a11  6a0c              push
   77c41a13  682047c177        push
   77c41a18  e8035affff        call
Set of instructions that occupy seven bytes
```

In this situation, some residual bytes will be left after the JMP and before the next valid instruction, in this example the 0xC1 and 0x77 bytes remaining before the next valid CALL instruction at address 0x77C41A18. If the residual bytes were to be executed it may be enough to crash the target process. This potential issue is addressed in subsequent steps below with respect to the generated code in the newly-allocated virtual memory. If a fixed length instruction set was used, then all that would have been replaced was the initial instruction, for example MOV of the previous example.

In an embodiment, the first bytes equal to the number of two times the maximum instruction size of the processor are read into the profiling framework module 214 address space using the ReadProcessMemory function. The profiling framework module 214 then uses the disassembler to determine what instructions are either fully or partially replaced by the overlay of the JMP instruction. As described below, the return from the disassembler indicates how many bytes are needed to be moved to the generated code section in order to maintain full instructions due to the overlay of the JMP.

At step 720, the profiling framework module 214 writes a PUSH instruction of the unique hook identifier previously received from the adapter module 212 to the generated code section. This will be a push of the unique hook identifier onto the stack of the target process. This is done so that the unique hook identifier may be passed to an internal framework procedure for further processing.

At step 722, the profiling framework module 214 again determines whether the adapter module 212 specified a hot patch hook for the target application. Since the profiling framework module 214 makes modifications at the instruction level, the profiling framework module 214 may also perform hot patches, because hot patches are instruction modifications that redirect code execution. The profiling framework module 214 may hot patch code that does not include any previously embedded hot patchable instruction pattern. In an embodiment, the adapter module 212 provides the address of the function which can be accomplished using any of the previous methods described with respect to FIG. 6.

If it is determined at step 722 that the requested hook is not for a hot patch, then at step 724 the profiling framework module 214 writes a CALL instruction to one of a few possible internal framework procedures. The specific procedure depends on the hooking type specified by the adapter module 212. For example, the call may be to an internal framework Enter procedure. In an embodiment, the number of instructions necessary for the CALL instruction depends on whether the CPU architecture is a 32 bit architecture or a 64 bit CPU architecture (and, for the 64 bit architecture, whether the target application is still 32 bit).

The process 700 proceeds to step 726 where the original instructions that were either partially or fully overwritten by the JMP instruction are written following the CALL instruction in the generated code section. In embodiments where a fixed size instruction set is used, the original instructions may include just one instruction that was replaced by the JMP instruction. However, in embodiments using a variable length instruction set, it can be any number of bytes up to the size of the JMP instruction plus the maximum instruction size of the given architecture, multiplied by two minus one. The possibility of two times the maximum instruction size minus one is due to the possibility of some residual bytes left after the overlay of the JMP instruction. If an instruction is even partially overwritten due to a variable length instruction set, then that instruction also needs to be copied to the generated code section. With respect to the above variable-length example the MOV, PUSH, and MOV would all be written. In the example where the instructions were greater than the size of the JMP instruction, both the first and second PUSH instructions would be copied. Including these instructions in the generated code section allows the instructions that were at the beginning of the hook to still be executed after the call to the internal framework function which sends an enter notification to the adapter module 212.

During this step, the profiling framework module 214 also looks at the original instructions being written to the generated code section to determine if any of them utilize a relative address. If any relative addresses are found, then the profiling framework module 214 corrects the addresses so that they point to the correct addresses in response to movement of the original instructions to a new location within the address space. Depending upon whether the CPU architecture is 64-bit and whether the target application is also 64 bit, some additional instructions may need to be added since some 64 bit relative instructions are not available on some processor architectures. The conversion of the original instruction, depending upon if the new distance to the destination address is greater than 32 bits, may need to include additional instructions to perform a 64 bit absolute indirect instruction such as JMP or CALL, to name a few examples.

At step 728, the profiling framework module 214 adds a JMP back to the next instruction in the original code after the overwritten, original instructions. The destination of the JMP instruction may depend upon whether a variable or fixed length instruction set was used. If a fixed length instruction set is used, then the JMP instruction goes to the next fixed-size offset after the replacement JMP instruction. However, if a variable length instruction set is used, then the JMP might need to skip some residual bytes from the previous overlay. The JMP instruction thereby prevents those potentially fatal residual bytes from being executed. If a variable length instruction set is being used, the profiling framework module 214 will use the disassembler to determine what instructions are overwritten and what, if any, residual bytes will be left before performing the overwrite of the original instructions. The profiling framework module 214 may calculate and write the JMP instruction's relative offset to bypass the residual bytes and go directly to the next full instruction in the original code. In an embodiment, the number of instructions required for the JMP instruction depends on whether the CPU architecture is a 32 bit architecture or a 64 bit CPU architecture (and, for the 64 bit architecture, whether the target application is still 32 bit).

At step 730, the modified original code in the temporary buffer, and the generated code in the generated code buffer, is written back to the target process. This is again due to the fact that the code modification was being performed outside of the target process. For example, the above steps may be performed in the remote address space, which is then written back to the address space of the target process after the above code has been generated. Alternatively, each modification may be written back to the address space of the target process after each step. In an embodiment, the modified original code is written back using the Win32 WriteProcessMemory function.

The process then proceeds to step 732, where the instruction cache is flushed and the protections of the original code are changed back to the previous state, for example to read and execute only. In an embodiment, the call may be to the Win32 function FlushInstructionCache to flush the cache and to the VirtualProtectEx function to change the protections back. As a result of this process, the hot patch hook calls the adapter module 212.

For example, after the above steps have been completed, the original code (now modified) and the generated code section may look like the examples below:

| USER32!MessageBoxExW: | | |
|---|---|---|
| 7e450838 e9c3fdb782 | jmp | 00fd0600 |
| 7e45083d 6aff | push | 0FFFFFFFFh |
| Original Code Now Modified | | |
| 00fd0600 6800040000 | push | 400h |
| 00fd605 e81623acff | call | |
| 00fd060a 8bff | mov | edi,edi |
| 00fd060d 8bec | mov | ebp,esp |
| 00fd060f e92902487d | jmp | USER32!MessageBoxExW+0x5 |
| Generated Code | | |

The above lines are just one example of a specific instance of code. The above example shows the original code of a 32 bit process after overlaying of the hook point, as well as the instructions located in the generated code section.

Returning to step 722, if it is determined that the requested hook is for a hot patch but not to a direct replacement function, then the process 700 proceeds to step 734 where the profiling framework module 214 writes a CALL instruction to one of a few possible internal framework procedures. The specific procedure depends on the hooking type specified by the adapter module 212. For example, the call may be to an internal framework replacement procedure. In an embodiment, the number of instructions required for the CALL instruction depends on whether the CPU architecture is a 32 bit architecture or a 64 bit CPU architecture (and, for the 64 bit architecture, whether the target application is still 32 bit).

The process 700 then proceeds to step 736, where the profiling framework module 214 adds a return instruction to the generated code buffer after the CALL instruction.

At step 738, the profiling framework module 214 writes the original instructions that were either partially or fully overwritten by the JMP instruction in the generated code buffer after the return instruction. Although this section of code will not execute because of the return instruction preceding it, the overwritten instructions may be retained in case it becomes necessary to later remove the hook to the hot patch. In other embodiments, however, the overwritten code does not have to be preserved.

The process 700 then proceeds back to steps 730 and 732, where the modified original code in the temporary buffer, and the generated code in the generated code buffer, is written back to the target process, the instruction cache is flushed, and the protections of the original code are changed back to their previous state. The adapter module 212 then executes whatever code the adapter module 212 was specified to execute as a replacement for the original code. This code may have been previously specified or may be dynamically generated based on one or more predetermined factors. The above steps have been discussed with respect to a 32 bit architecture. The following steps discuss how the procedure differs when a 64 bit architecture is used.

Returning to step 712, if the CPU architecture is 64 bit and the target application is 64 bit, the process 700 proceeds to step 716. The modification that the profiling framework module 214 makes to the instructions on the 64 bit architecture is based upon the distance from the target original instructions to the generated code section.

At step 716, the profiling framework module 214 determines whether the distance between the code sections is greater than a set size. In an embodiment, the set size may be 2 gigabytes. This size may be chosen because the relative 32 bit JMP instruction is limited to a 32 bit value that can be +/−2 GB. If the distance is less than two gigabytes, then the process 700 proceeds to step 714 and the same method of using a JMP can be used as with a 32 bit architecture.

If the size difference is greater than the set size, however, then the process 700 proceeds to step 718. At step 718, an instruction set having a second size is overlaid on the original code at the identified hook point and written to the temporary buffer. In an embodiment, the second size corresponds to a 64 bit CPU architecture and may be thirteen bytes in size. For example, the modification may include a push of the RAX register to preserve any use of the RAX register before modification for the patch, a MOV RAX instruction (for absolute address of the custom patch code), and JMP RAX instruction, which directs a jump to a new code location for execution (e.g., to generated code described above located in the newly-allocated virtual memory) instead of executing the original instructions that are overwritten. This hook is more involved because the 64 bit architecture does not support a 64 bit relative JMP instruction. An example of modification may be seen in the sample code below:

| 00000000'776e2b20 | 50 | push | rax |
| 00000000'776e2b21 | 48b81e10fl3f01000000 | mov | rax,offset (0000001'3ff1101e) |
| 00000000'776e2b2b | ffe0 | jmp | rax |
| X86-64 Instruction Modification | | | |

The process 700 may then return to step 720 and proceed as discussed above, except for the additional step of including the instruction POP RAX in the generated code section prior to executing the hook target instructions. The POP RAX instruction returns the RAX register to its original value.

Returning to step 710, if the adapter module 212 does specify a hot patch, the process 700 proceeds to step 740, where the profiling framework module 214 determines whether the requested hook is for a direct replacement function. If the requested hook is for a hot patch but not to a direct replacement function, then the process 700 proceeds back to step 712 and proceeds as discussed above.

If the requested hook is for a direct replacement function, the process 700 proceeds to step 742. At step 742, a call to an adapter direct replacement function is overlaid on the original code at the identified hook point. For example, the call may bypass any internal functions within the adapter host module 216 and go directly to a replacement function specified by the adapter module 212, for example by providing an address of the replacement function. In an embodiment, the number of instructions necessary for the CALL instruction depends on whether the CPU architecture is a 32 bit architecture or a 64 bit CPU architecture (and, for the 64 bit architecture, whether the target application is still 32 bit).

At step 744, the profiling framework module 214 writes the original instructions that were either partially or fully overwritten by the JMP instruction in the generated code buffer. Although this section of code will not execute because the execution path does not enter this section, the overwritten instructions may be retained in case it becomes necessary to later remove the hook to the hot patch. In other embodiments, however, the overwritten code does not have to be preserved.

The process 700 then proceeds to steps 730 and 732, as discussed above.

This is repeated again for each hook site identified in the list received from the adapter module 212.

Exemplary Code Execution Paths

Figure 8:
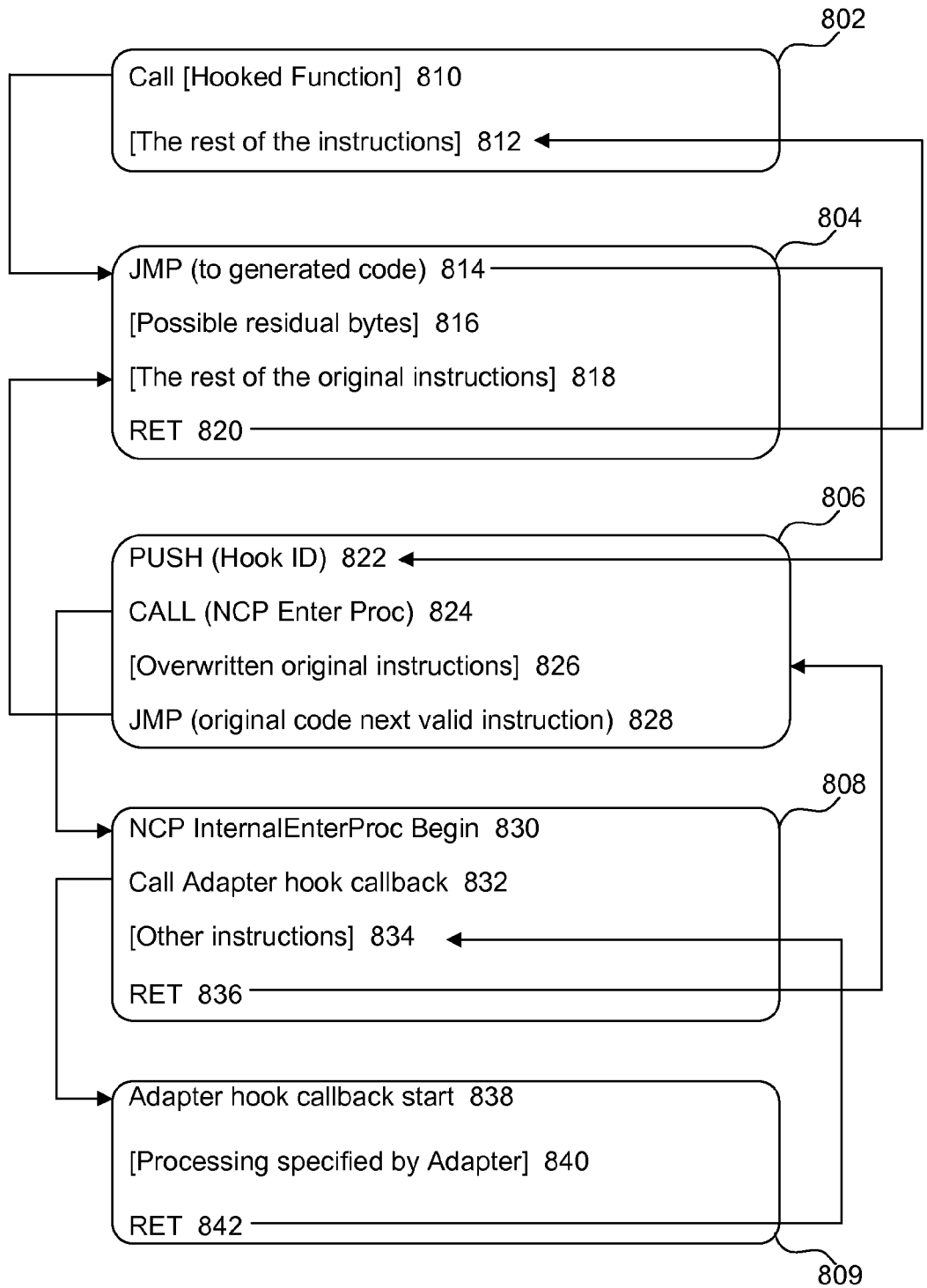
FIG. 8 illustrates an exemplary execution path for hooked code according to an embodiment.

FIG. 8 illustrates an exemplary execution path 800 of the modified original code and the newly generated code in the generated code section through a function call, according to an embodiment. In an embodiment, the execution path 800 corresponds to an internal enter only hook of a function. The execution path 800 will be discussed below with respect to a 32 bit example for sake of simplicity of discussion, though embodiments of the present disclosure also apply to 64 bit (or other size) situations as well.

The adapter host library's internal enter procedure addresses the issue of preserving the stack and registers of the target process, regardless of hooked function calling convention and compiler, before returning control to the function's original code. In an embodiment, the stack is guaranteed to be in the state it was when calling the hooked function because the adapter host library's internal enter procedure removes any values it or the generated code section has pushed onto the stack. This is possible because the generated code section pushed the hook identifier onto the stack prior to calling the internal enter procedure, as discussed above with respect to FIG. 7. The internal enter procedure removes that entry from the stack prior to transferring control back to the original function's instructions.

The path 800 begins with the call instruction 810 in the caller to hooked function 802. The call instruction 810 represents a call to a hooked function 804 that the adapter module 212 identified as a function to hook within the target application.

The call instruction 810 calls the hooked function 804, to which the execution path 800 then proceeds, where a JMP instruction 814 has been overlaid over the original code as discussed above with respect to FIG. 7.

The JMP instruction 814 directs the execution path 800 to the generated code section 806, starting with PUSH instruction 822. In an embodiment, the PUSH instruction 822 is used to push the hook identifier onto the stack.

After the PUSH instruction 822, the execution path 800 proceeds to the next instruction in the generated code section 806, which may be a CALL instruction 824. The CALL instruction 824 is to host library 808, as described above with respect to step 724 of FIG. 7. In an embodiment, the host library 808 may be the adapter host library 216 that has been injected into the target process. The CALL instruction 824 is to a beginning instruction 830 within the host library 808, for example a call to an internal enter procedure.

The execution path 800 proceeds from the beginning instruction 830 to call an adapter hook callback 832. Although other instructions 834 is shown as coming after the adapter hook callback 832, a portion of the other instructions 834 may occur before the adapter hook callback 832 and a portion after the adapter hook callback 832. These other instructions may be instructions used for preserving registers of the target process. These instructions are also CPU architecture specific but in the case of the 32 bit architecture, the adapter host library 216 may use the PUSH, PUSHAD, PUSHFD, or like instructions upon enter. These instructions push register values onto the stack so they can later be returned to the registers. Before returning to the original code POP, POPAD, POPFD or like instructions are used to remove the value(s) from the stack and return the values to the register from which the value was pushed onto the stack. The instructions used and what registers are stored on the stack is determined by calling convention (if that can be obtained from the symbols). Otherwise, the adapter host module 216 preserves more values to ensure the state can be preserved.

The adapter hook callback 832 is to an adapter hook callback start instruction 838 in the adapter library 809. In an embodiment, the adapter library 809 may be a part of adapter module 212. The execution path 800 proceeds to the next instruction in the adapter library 809, which may be any amount of processing instructions 840 specified by the adapter module 212. In various embodiments, this may include instrumentation code, hot patch code, or a replacement function to name just a few examples.

After execution of the processing instructions 840, the return instruction 842 returns the execution path 800 from the adapter library 809 back to the other instructions 834 in the host library 808.

After execution of the other instructions 834, the execution path 800 proceeds via return instruction 836 to leave the host library 808 to return back to the overwritten original instructions 826 in the generated code section 806.

The overwritten original instructions 826 may be any original instructions that were overwritten in the hooked function 804 by the JMP 814. After executing these instructions, the execution path 800 reaches JMP instruction 828, which directs the execution path 800 back to the next valid instruction 818 in the original code of the target function 804. Where there may have been some residual bytes 816 left over from overlaying the JMP instruction 814, the JMP instruction 828 directs the execution path 800 to the next valid instruction after the residual bytes 816.

Once the next valid instruction 818 and the rest of the instructions in the hooked function 804 are executed, the execution path 800 reaches return instruction 820, which returns the execution path 800 to the rest of the instructions 812 in the caller to hooked function 802.

The above execution path 800 generally describes the path taken by hooking procedures that preserve original code that has been overwritten. In embodiments where a replacement function is to be applied, after the processing instructions 840 in the adapter library 809 are executed the execution path 800 returns back to the caller to hooked function 802, bypassing the hooked function 804 entirely.

The preservation of the stack and registers is common to all of the framework internal Enter functions. There are two variants to this preservation because there is additional processing needed for staging a Leave notification. Besides preserving the stack and registers, both call the enter callback function specified by the adapter module 212. In both cases the adapter host module 216 calls the adapter callback function passing the hook identifier.

Although the execution path 800 was discussed above with respect to a function, it may also describe the path with respect to a hooked instruction or a hot patch that uses a generic handler. For example, in embodiments where an instruction, instead of a function, is hooked, there would not be any caller to hooked function 802. Instead, as the execution path reached the hooked instruction, it would then jump to the generated code section 806. Then, once the execution path had jumped back to the rest of the original instructions 818, there would not be a return instruction 820 to go back to the caller to hooked function 802.

In an alternative embodiment where the hook is for a hot patch using a with a generic handler, the execution path 800 follows the same path discussed above with respect to a function except for the following differences. In embodiments where the overwritten original instructions 826 are preserved after a hot patch, the overwritten original instructions 826 are written to the generated code section 806 after the JMP instruction 828, instead of before, so the execution path does not traverse instructions 826. For a hot patch with a generic handler, the CALL instruction 824 within the generated code section 806 may be to an internal replacement procedure within the host library 808, instead of an internal Enter procedure as may be used for a hooked function described above. Once the execution path 800 has executed the instructions in the adapter library 809, any parameters placed on the stack that would have been given to a hooked function may be popped off of the stack so that the process returns to the caller with the stack in the same configuration if the hook did not exist. After the execution path 800 returns from the host library 808 after performing the instructions in the adapter library 809, the execution path follows return instruction 836 to JMP instruction 828, without executing any of the overwritten original instructions 826.

In an alternative embodiment where the hook is for a hot patch for a direct replacement function, the execution path 800 skips host library 808 entirely. This is because, instead of a JMP instruction in the overlaid code of the hooked function, a call has been overlaid directly to the replacement function, for example located in adapter library 809. For example, the replacement function may have a 1-to-1 correspondence to the hooked function that it is replacing. When the caller to hooked function 802 calls the hooked function 804 at call instruction 810, the execution path 800 proceeds to call instruction 814 (described as JMP instruction 814 in embodiments above where it is a JMP instruction), which calls the replacement function within the adapter library 809. Once the execution path 800 has executed the replacement function in the adapter library 809, any parameters placed on the stack that would have been given to a hooked function may be popped off of the stack so that the process returns to the caller with the stack in the same configuration if the hook did not exist. In embodiments where there is a 1-to-1 correspondence to the hooked function being replaced, this may be handled by the compiler and extra parameters may not need to be popped off of the stack before returning.

The execution path 800 then returns directly to the rest of the instructions 812, thereby bypassing the rest of the hooked function 804 as well as the host library 808. In embodiments where the overwritten original instructions 826 are preserved after a hot patch, the overwritten original instructions 826 are written to the generated code section 806. However, since the execution path 800 bypasses the generated code section 806 entirely in embodiments where the hook is for a hot patch for a direct replacement function, this code is not executed but is rather preserved in case the hot patch is later removed.

Figure 9:
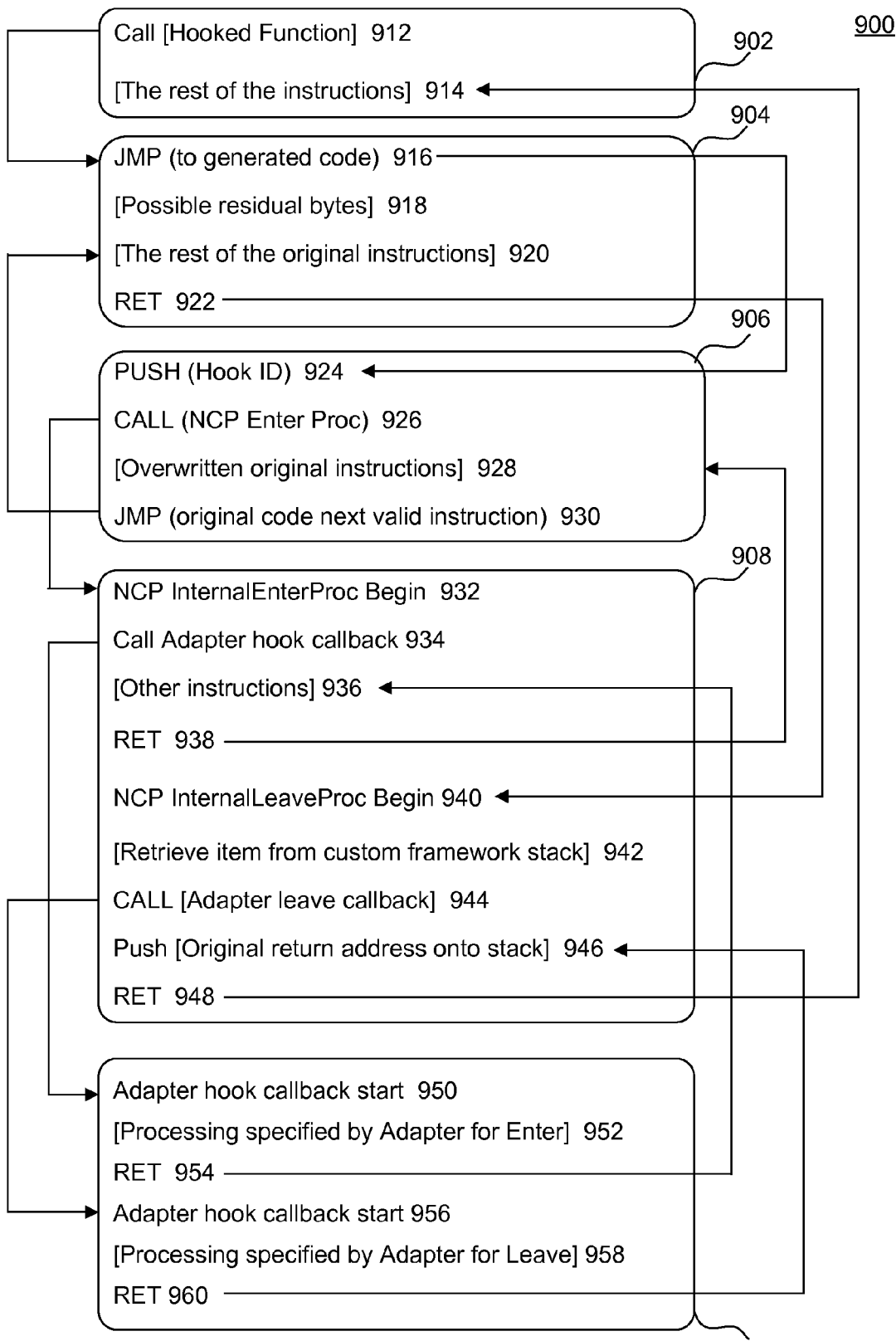
FIG. 9 illustrates an exemplary execution path for hooked code according to an embodiment.

FIG. 9 illustrates an exemplary execution path 900 of the modified original code and the newly generated code in the generated code section, according to an embodiment. In an embodiment, the execution path 900 corresponds to an enter hook and a leave hook. In order for the profiling framework module 214 to support profiling, both enter and leave notifications are needed. This is where the specialized framework internal Enter function that provides support for leave notifications differs from the internal Enter function that does not. Only those differences from the execution path 800 of FIG. 8 will be discussed below. For example, in the hooked function 904 the return instruction 922 returns to the internal leave instruction 940 within the host library 908, instead of back to the rest of the instructions in the caller to hooked function 902.

The specialized Enter function used in FIG. 9 adds support for leave notifications. To do so, it ensures that another internal function, used to send a leave notification to the adapter module 212, is called when the hooked function returns. It does this by modifying the return address of the caller on the stack to instead contain the address of the internal Leave function. This modification ensures that when the hooked function returns, the CPU will pop the return address and jump to the internal Leave function.

When the internal Leave function is called, the adapter host module 216 can notify the adapter module 212 that the hooked function has left. When notifying the adapter module 212, the unique hook identifier is passed so that the adapter module 212 can identify what hook is leaving. In an embodiment, the internal Leave function is not a generated function that resides within the generated code section 906 but rather a generic internal leave procedure including instructions 940 through 948, which are part of the host library 908, that is used by all hooked functions. Unlike the generated code that is used in conjunction with the internal Enter function, the unique hook identifier is not embedded within the code. Instead it is stored elsewhere and retrieved later upon leaving the function. In this manner, the unique identifier can be reported to the adapter. In an embodiment, the stack is not used here for temporary storage so that the stack may be as it was when the function was called. This enables the internal leave instructions of host library 908, as well as the adapter library 910, to correctly retrieve passed parameters via the host library 908.

The internal leave procedure, including instructions 940 through 948, enables the CPU to jump back to the original caller's return address when the internal leave instruction 940 is called. The internal Enter function stores the original return address, the stack location where the replacement occurred, and the hook identifier in an item within a custom profiling framework thread stack. To create the custom profiling framework thread stack, a set of pages may be reserved but not committed. The number of pages reserved is calculated based on the current thread's stack size. Only the first page is committed, which is the page that the custom stack will first begin using. As the number of nested hooked calls increase and more items are added to the custom stack, the current set of committed pages will not be large enough. At that time, the adapter host module 216 will commit the next page from within the set of remaining reserved pages.

The adapter host module 216 will then be able to use the newly committed page for additional stack storage. Because the custom profiling framework thread stack is based on the thread's stack size, the thread's stack may run out before the custom profiling framework thread stack. Reserved pages only reserve space in the process address space whereas committed pages actually add to the amount of virtual memory in use. In an embodiment, since the custom profiling framework thread stack is thread specific, the adapter host module 216 may use Thread Local Storage (TLS) to hold a pointer to the custom profiling framework thread stack.

The internal Enter function then modifies the return address on the real stack to point to the internal Leave function. When the internal Leave function is called, it performs register preservation at instruction steps and pops an item from the custom profiling framework thread stack at instruction 942, and calls the adapter module 212's leave callback function at instruction 944. Before calling the adapter leave callback function at instruction 944, the original return address may be pushed onto the stack along with the hook identifier, so that the adapter hook callback will receive the hook identifier as its first parameter. The execution path 900 then proceeds to the adapter library 910 to adapter hook callback start instruction 956. The execution path 900 proceeds to the next instruction in the adapter library 910, which may be any amount of processing instructions 958 specified by the adapter module 212 upon a leave notification.

After execution of the processing instructions 958, the return instruction 960 returns the execution path 900 from the adapter library 910 back to the push instruction 946 in the host library 908.

The push instruction 946 pushes the original return address onto the stack. In an embodiment, prior to push instruction 946 the hook identifier may be popped from the stack for the purpose of stack preservation. Further, after these steps the original return address value may be restored. After these steps the execution path returns at return instruction 948. Since the Leave function first pushes the original return address onto the stack, which was obtained from an item within the custom profiling framework thread stack, the CPU will POP and return to the original return address 914 when the internal Leave function returns to application 902.

Embodiments of the present disclosure may also be used while a debugger is in use. In order to view call stacks in the debugger when a call frame exists for a hooked function in the stack that is not the current function and to get leave notifications, the adapter host module 216 replaces the return address with the address of the internal leave function for each hooked function call. A debugger may use private symbols, where available, to determine call stacks. The private symbols may contain the number of function parameters as well as the type of the parameters for the function.

When private symbols are not available, debuggers may resort to using a standard call frame pattern where an extended base pointer (EBP) is pushed onto the stack. Functions push EBP on the stack to preserve the register so that it can move the current value of an extended stack pointer (ESP) into EBP. This may all be done as part of the function prologue and may be done so that the code can easily locate parameters and local data from the call frame base location after the prologue. This is easier than using ESP alone because the value of ESP changes as local data is used. The use of EBP in this pattern allows for a linked list of call frames within the stack that can then be traversed.

Debuggers, and even code, can use this linked list to traverse call stacks. When a debugger attempts to show the debugger's user the call stack, the debugger gets to the hooked function call frame and looks at the return address to find the caller's address. This address will not be resolved because the profiling framework symbols will not be available and will appear in the debugger as the profiler host module with an offset address. This is incorrect since the profiling framework is not really the caller of this function. For this reason, the profiling framework module 214 may include a debugger extension for the Windows® platform and an equivalent tool for other platforms. On the Windows® platform, a debugger extension can be used by Microsoft's WinDbg or Visual Studio as well as other tools that allow for the use of debugger extensions.

In an embodiment, the framework debugger extension has an extension function that may be used to view the repaired call stack. To repair the call stack for viewing, the framework debugger extension uses the current thread's custom profiling framework thread stack to replace the Leave function's address with the original caller function addresses, which are all stored within the custom profiling framework thread stack. This does not change the thread's stack; rather, it is used to present the correct call stack to the user.

Exemplary Hook Removal Algorithm

Figure 10:
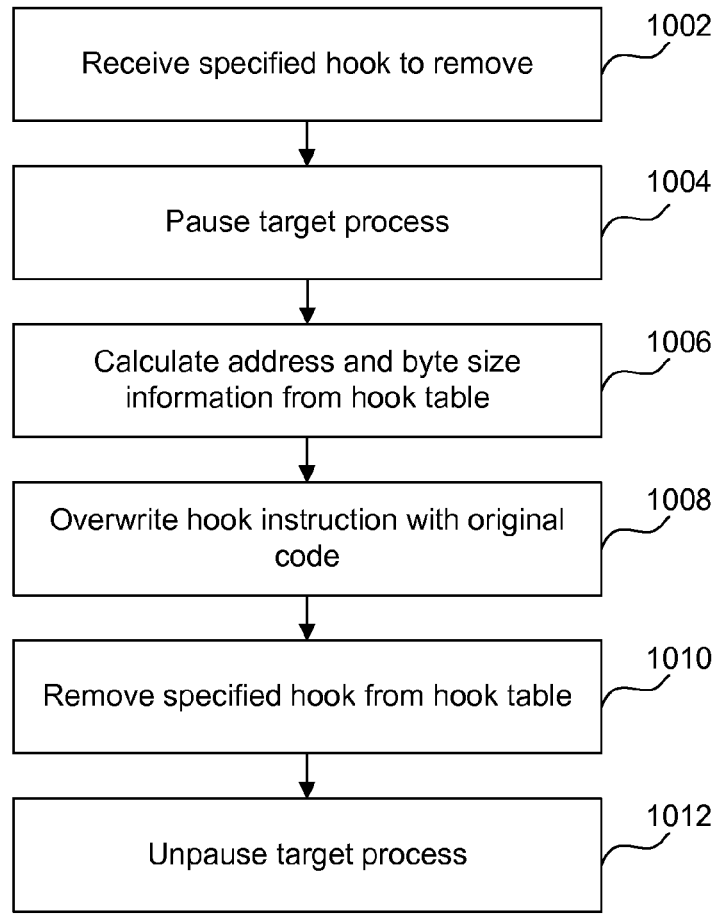
FIG. 10 illustrates an exemplary process for removing code hooks from an application according to an embodiment.

As discussed above, embodiments of the present disclosure are able to attach to an already running process. It is also possible to remove hooks without terminating the process, since the profiling framework module 214 tracks instrumentation, for example with the hook table (such as hook table 302) discussed previously. The hook table, along with the generated code section (such as located within code page 304) contains the information useful to return to the original code. FIG. 10 illustrates an exemplary process 1000 for removing hooks from an application according to an embodiment. Process 1000 may be performed by the server 200 of FIG. 2, for example by the profiling framework module 214.

The process of removing hooks is similar to that of adding hooks. At step 1002, the adapter host module 216 in the target process receives specific unique identifiers, such as hook identifiers, of hooks to remove in a call. The adapter host module 216 forwards this call to the profiling framework module 214. The profiling framework module 214 is used so that the removal is done out of process.

At step 1004, the profiling framework module 214 pauses the target process in order to make the requested modifications. The profiling framework module 214 may locate the hook table and iterate over the listed identifiers supplied by the adapter module 212.

At step 1006, the profiling framework module 214 calculates the address at which it will copy bytes from the generated code (for example, located at the generated code section) and the number of bytes in order to restore the original function. In an embodiment, this may be accomplished by first retrieving the custom address member of the current hook table entry. The profiling framework module 214 may add the combined size of a PUSH and a CALL instruction as used within the generated code section. In embodiments where original code is being restored from a hot patch, the location of the original code preserved in the generated code section may be at a different location, e.g. after the generated code return instruction. The profiling framework module 214 obtains this information from an entry in the hook table, for example a HookType member of the hook table shown above in Table 1.

In an example where the processor architecture is example 32 bit, the PUSH may be five bytes and the CALL five bytes. The profiling framework module 214 adds the computed number of bytes (in this example ten) to the generated code address for a new address. The profiling framework module 214 copies the number of bytes specified in the relocated bytes member of the current hook table entry from the calculated custom function address to a local buffer. The profiling framework module 214 then changes the protection of the address specified within the hook address of the hook table entry to have write protection.

In situations with a 64 bit architecture where a larger than two gigabyte offset occurred and there is an additional POP RAX within the generated code, the profiling framework accounts for that by using the Modification Type field value. If the Modification Type value is 64 absolute jump, then the size of the POP RAX instruction is added to the size of the instructions that are skipped over.

At step 1008, the profiling framework module 214 overwrites the instructions at the Hook Address in the original instructions with the bytes copied from the generated code.

At step 1010, the profiling framework module 214 removes the entry corresponding to the specified hook identifier from the hook table. The protection is then returned back to the original protection. In an embodiment, the FlushInstructionCache function is called. The process 1000 has now returned the original code of the target application to the way it was prior to hooking.

At step 1012, the profiling framework module 214 unpauses the target process and regular operation of the target process ensues.

Example Computer System

Computer system 1100 includes one or more processors, such as processor 1104. Processor 1104 can be a special purpose or a general purpose digital signal processor. Processor 1104 is connected to a communication infrastructure 1102 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1100 also includes a main memory 1106, preferably random access memory (RAM), and may also include a secondary memory 1108. Secondary memory 1108 may include, for example, a hard disk drive 1110 and/or a removable storage drive 1112, representing a floppy disk drive, a magnetic tape drive, an optical disk drive, or the like. Removable storage drive 1112 reads from and/or writes to a removable storage unit 1116 in a well-known manner. Removable storage unit 1116 represents a floppy disk, magnetic tape, optical disk, or the like, which is read by and written to by removable storage drive 1112. As will be appreciated by persons skilled in the relevant art(s), removable storage unit 1116 includes a computer usable storage medium having stored therein computer software and/or data.

In alternative implementations, secondary memory 1108 may include other similar means for allowing computer programs or other instructions to be loaded into computer system 1100. Such means may include, for example, a removable storage unit 1118 and an interface 1114. Examples of such means may include a program cartridge and cartridge interface (such as that found in video game devices), a removable memory chip (such as an EPROM, or PROM) and associated socket, a thumb drive and USB port, and other removable storage units 1118 and interfaces 1114 which allow software and data to be transferred from removable storage unit 1118 to computer system 1100.

Computer system 1100 may also include a communications interface 1120. Communications interface 1120 allows software and data to be transferred between computer system 1100 and external devices. Examples of communications interface 1120 may include a modem, a network interface (such as an Ethernet card), a communications port, a PCMCIA slot and card, etc. Software and data transferred via communications interface 1120 are in the form of signals which may be electronic, electromagnetic, optical, or other signals capable of being received by communications interface 1120. These signals are provided to communications interface 1120 via a communications path 1122. Communications path 1122 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1116 and 1118 or a hard disk installed in hard disk drive 1110. These computer program products are means for providing software to computer system 1100.

Computer programs (also called computer control logic) are stored in main memory 1106 and/or secondary memory 1108. Computer programs may also be received via communications interface 1120. Such computer programs, when executed, enable the computer system 1100 to implement the present disclosure as discussed herein. In particular, the computer programs, when executed, enable processor 1104 to implement the processes of the present disclosure, such as any of the methods described herein. Accordingly, such computer programs represent controllers of the computer system 1100. Where the disclosure is implemented using software, the software may be stored in a computer program product and loaded into computer system 1100 using removable storage drive 1112, interface 1114, or communications interface 1120.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A method for hooking machine code, comprising:
receiving, at a server, from an adapter module identifying information for a target function of a target application to hook;
pausing, by the server, the target application;
locating, by the server, the target function in the target application based on the identifying information;
hooking, by the server, the target function outside the target application to create hooked code, wherein said hooking comprises:
determining whether the target application was designed for a first architecture type or a second architecture type,
determining, in response to the target application being designed for the second architecture type, whether a distance between a location of the target function and a location of the hooked code is greater than a pre-set address offset,
overlaying an instruction set having a first size to jump to a first new code location in response to the target application being designed for the first architecture type or in response to determining that the distance is less than the pre-set offset, and
overlaying an instruction set having a second size to jump to a second new code location in response to determining that the distance is greater than the pre-set offset, wherein the second size is larger than the first size; and
maintaining, by the server, a tracking table for tracking hook points, wherein the hook points correspond to locations where one or more target functions are hooked.

2. The method of claim 1, wherein the hooking comprises:
allocating virtual memory in the target application for the hooked code;
injecting an adapter host library into the target application; and
modifying application code of the target function with a hook call, the method further comprising:
unpausing the target application to continue operation.

3. The method of claim 1, wherein the identifying information comprises a function name of the target function, the locating the target function comprising:
locating an entry in an export name table corresponding to the function name;
indexing into a location of an export ordinal table based on an index value corresponding to the located entry in the export name table;
indexing into an export address table based on the indexed location of the export ordinal table to obtain a relative virtual address of the target function; and
determining an address of the target function by combining the relative virtual address to a base address of a library in the target application.

4. The method of claim 1, wherein the identifying information comprises a function ordinal of the target function, the locating the target function comprising:
identifying an export directory base address based on structure information for a header of the target application;
subtracting the export directory base address from the function ordinal to obtain an index value;
indexing into an export address table, using the index value, to obtain a relative virtual address of the target function; and
determining an address of the target function by combining the relative virtual address to a base address of a library in the target application.

5. The method of claim 1, wherein the target function comprises a forwarded function, the locating further comprising:
locating the forwarded function identified as the target function;
following forwarding information in the forwarded function to an end of a forwarding chain, the end comprising an originating alias function; and
using an address of the originating alias function as an address of the target function.

6. The method of claim 1, further comprising:
allocating virtual memory for the hooked code;
receiving a unique identifier from the adapter module in response to hooking the code;
identifying the hooked code by the unique identifier in the tracking table; and
removing the unique identifier from the tracking table in response to de-hooking of the target function.

7. The method of claim 1, further comprising dynamically hooking and de-hooking the identified function during execution of the target application module.

8. A system for hooking machine code, comprising:
a processor; and
a non-transitory computer-readable storage medium storing instructions that, when executed by the processor, cause the system to perform a method comprising:
receiving identifying information for a target function of a target application to hook;
pausing the target application;
locating the target function in the target application based on the identifying information;
hooking, by the server, the target function outside the target application to create hooked code, wherein said hooking comprises:
determining whether the target application was designed for a first architecture type or a second architecture type,
determining, in response to the target application being designed for the second architecture type, whether a distance between a location of the target function and a location of the hooked code is greater than a pre-set address offset,
overlaying an instruction set having a first size to jump to a first new code location in response to the target application being designed for the first architecture type or in response to determining that the distance is less than the pre-set offset, and
overlaying an instruction set having a second size to jump to a second new code location in response to determining that the distance is greater than the pre-set offset, wherein the second size is larger than the first size; and
maintaining, by the server, a tracking table for tracking hook points, wherein the hook points correspond to locations where one or more target functions are hooked.

9. The system of claim 8, wherein the method further comprises:
injecting the adapter host module into the target application module;
modifying application code of the target function with a hook call; and
unpausing the execution the target application module to continue operation.

10. The system of claim 8, wherein identifying information comprises a function name of the target function, and wherein the method further comprises:
- locating an entry in an export name table corresponding to the function name;
- indexing into a location of an export ordinal table based on an index value corresponding to the located entry in the export name table;
- indexing into an export address table based on the indexed location of the export ordinal table to obtain a relative virtual address of the target function; and
- determining an address of the target function by combining the relative virtual address to a base address of a library in the target application module.

11. The system of claim 8, wherein the identifying information comprises a function ordinal of the target function, and the method further comprises:
- identifying an export directory base address based on structure information for a header of the target application module;
- subtracting the export directory base address from the function ordinal to obtain an index value;
- indexing into an export address table, using the index value, to obtain a relative virtual address of the target function; and
- determining an address of the target function by combining the relative virtual address to a base address of a library in the target application module.

12. The system of claim 8, wherein the target function comprises a forwarded function, and the method further comprises:
- locating the forwarded function identified as the target function;
- following forwarding information in the forwarded function to an end of a forwarding chain, the end comprising an originating alias function; and
- using an address of the originating alias function as an address of the target function.

13. The system of claim 8, wherein the method further comprises dynamically hooking and de-hooking the identified function during execution of the target application module.

14. A non-transitory computer-readable storage medium having control logic recorded thereon that, when executed by a processor, causes the processor to perform a method for hooking machine code, the method comprising:
- receiving identifying information for a target function of a target application to hook from an adapter module;
- pausing the target application;
- locating the target function in the target application based on the identifying information;
- hooking, by the server, the target function outside the target application to create hooked code, wherein said hooking comprises:
  - determining whether the target application was designed for a first architecture type or a second architecture type,
  - determining, in response to the target application being designed for the second architecture type, whether a distance between a location of the target function and a location of the hooked code is greater than a pre-set address offset,
  - overlaying an instruction set having a first size to jump to a first new code location in response to the target application being designed for the first architecture type or in response to determining that the distance is less than the pre-set offset, and
  - overlaying an instruction set having a second size to jump to a second new code location in response to determining that the distance is greater than the pre-set offset, wherein the second size is larger than the first size; and
- maintaining, by the server, a tracking table for tracking hook points, wherein the hook points correspond to locations where one or more target functions are hooked.

15. The non-transitory computer-readable storage medium of claim 14, wherein the hooking comprises:
- injecting an adapter host library into the target application; and
- modifying application code with a hook call, the method further comprising:
- unpausing the target application to continue operation.

16. The non-transitory computer-readable storage medium of claim 14, wherein the identifying information comprises a function name of the target function, the locating the target function comprising:
- locating an entry in an export name table corresponding to the function name;
- indexing into a location of an export ordinal table based on an index value corresponding to the located entry in the export name table;
- indexing into an export address table based on the indexed location of the export ordinal table to obtain a relative virtual address of the target function; and
- determining an address of the target function by combining the relative virtual address to a base address of a library in the target application.

17. The non-transitory computer-readable storage medium of claim 14, wherein the identifying information comprises a function ordinal of the target function, the locating the target function comprising:
- identifying an export directory base address based on structure information for a header of the target application;
- subtracting the export directory base address from the function ordinal to obtain an index value;
- indexing into an export address table, using the index value, to obtain a relative virtual address of the target function; and
- determining an address of the target function by combining the relative virtual address to a base address of a library in the target application.

18. The non-transitory computer-readable storage medium of claim 14, wherein the target function comprises a forwarded function, the locating further comprising:
- locating the forwarded function identified as the target function;
- following forwarding information in the forwarded function to an end of a forwarding chain, the end comprising an originating alias function; and
- using an address of the originating alias function as an address of the target function.

19. The non-transitory computer-readable storage medium of claim 14, wherein the method further comprises dynamically hooking and de-hooking the identified function during execution of the target application module.

* * * * *